(12) United States Patent
Kadlicko

(10) Patent No.: US 7,992,484 B2
(45) Date of Patent: Aug. 9, 2011

(54) ROTARY HYDRAULIC MACHINE AND CONTROLS

(75) Inventor: George Kadlicko, Rockford, IL (US)

(73) Assignee: Haldex Hydraulics Corporation, Rockford, IL (US)

( * ) Notice: Subject to any disclaimer, the term of this patent is extended or adjusted under 35 U.S.C. 154(b) by 474 days.

(21) Appl. No.: 11/502,193

(22) Filed: Aug. 10, 2006

(65) Prior Publication Data

US 2007/0028608 A1     Feb. 8, 2007

Related U.S. Application Data

(63) Continuation of application No. PCT/US2005/004723, filed on Feb. 11, 2005, and a continuation-in-part of application No. 10/776,768, filed on Feb. 11, 2004, now Pat. No. 7,086,225, and a continuation-in-part of application No. 10/776,769, filed on Feb. 11, 2004, now Pat. No. 7,402,027, and a continuation-in-part of application No. 10/776,770, filed on Feb. 11, 2004, now Pat. No. 7,364,409, and a continuation-in-part of application No. 10/776,771, filed on Feb. 11, 2004, now Pat. No. 7,124,677, and a continuation-in-part of application No. 10/776,772, filed on Feb. 11, 2004, now Pat. No. 7,380,490.

(51) Int. Cl.
*F01B 3/02* (2006.01)

(52) U.S. Cl. ...................................... 92/12.2; 92/DIG. 2
(58) Field of Classification Search .................... 92/12.2, 92/DIG. 2
See application file for complete search history.

(56) References Cited

U.S. PATENT DOCUMENTS

| | | | |
|---|---|---|---|
| 2,409,185 A * | 10/1946 | Blasutta | 92/12.2 |
| 2,871,798 A * | 2/1959 | Thoma | 91/489 |
| 3,007,420 A | 11/1961 | Budzich | |
| 3,085,514 A | 4/1963 | Budzich | |
| 3,124,079 A | 3/1964 | Boyer | |
| 3,169,488 A | 2/1965 | Galliger | |
| 3,175,510 A | 3/1965 | D'Amato | |
| 3,395,948 A | 8/1968 | Andrews | |
| 3,479,963 A | 11/1969 | Randa et al. | |

(Continued)

FOREIGN PATENT DOCUMENTS

DE         19721759 A1    11/1998

(Continued)

OTHER PUBLICATIONS

Frankenfield; "Using Industrial Hydraulics". Published by Hydraulics and Pneumatics Magazine, Cleveland, Ohio, 1990. p. 6-16, 6-19, 6-32.

*Primary Examiner* — F. Daniel Lopez
(74) *Attorney, Agent, or Firm* — St. Onge Steward Johnston & Reens LLC

(57) ABSTRACT

A variable capacity hydraulic machine has a rotating group located within a casing and a control housing secured to the casing to extend across and seal an opening in the casing. The control housing accommodates a control circuit and a pair of sensors to sense change in parameters associated with the rotating group. One of the sensors is positioned adjacent the barrel on the rotating group to sense rotational speed and the other senses displacement of the swashplate. The control housing accommodates a control valve and accumulator to supply fluid to the control valve.

40 Claims, 25 Drawing Sheets

U.S. PATENT DOCUMENTS

| | | | |
|---|---|---|---|
| 3,550,233 A | 12/1970 | Rubery et al. | |
| 3,682,044 A | 8/1972 | Ankeny et al. | |
| 3,702,576 A | 11/1972 | Pruvot | |
| 3,726,189 A | 4/1973 | Rubery | |
| 3,741,077 A | 6/1973 | Hulsebus et al. | |
| 3,779,137 A | 12/1973 | Koivunen | |
| 3,791,703 A | 2/1974 | Ifield | |
| 3,803,687 A | 4/1974 | Alger, Jr. et al. | |
| 3,808,659 A | 5/1974 | Alger, Jr. et al. | |
| 3,808,950 A | 5/1974 | Davies | |
| 3,810,419 A | 5/1974 | Smith | |
| 3,828,654 A | 8/1974 | Wiethoff | |
| 3,872,775 A | 3/1975 | Clerk | |
| 3,898,917 A | 8/1975 | Adams et al. | |
| 3,922,854 A | 12/1975 | Coeurderoy | |
| 3,933,082 A | 1/1976 | Molly | |
| 3,963,039 A | 6/1976 | Coeurderoy | |
| 4,129,063 A | 12/1978 | Ifield | |
| 4,201,117 A | 5/1980 | Gherner | |
| 4,481,867 A | 11/1984 | Nagase et al. | |
| 4,515,067 A * | 5/1985 | Heyl | 92/12.2 |
| 4,540,221 A | 9/1985 | Frazer | |
| 4,540,345 A | 9/1985 | Frazer | |
| 4,543,876 A | 10/1985 | Heyl et al. | |
| 4,823,552 A | 4/1989 | Ezell et al. | |
| 4,907,408 A | 3/1990 | Barker | |
| 4,928,487 A | 5/1990 | Nikolaus | |
| 5,073,091 A | 12/1991 | Burgess et al. | |
| 5,076,377 A | 12/1991 | Frazer | |
| 5,086,689 A | 2/1992 | Masuda | |
| 5,135,031 A | 8/1992 | Burgess et al. | |
| 5,317,873 A | 6/1994 | Okuda et al. | |
| 5,538,401 A | 7/1996 | Schaffner et al. | |
| 5,540,139 A | 7/1996 | Martensen et al. | |
| 5,588,347 A * | 12/1996 | Jepsen | 92/12.2 |
| 5,785,150 A | 7/1998 | Tominaga et al. | |
| 5,881,629 A | 3/1999 | Gollner et al. | |
| 5,900,541 A | 5/1999 | Morris | |
| 5,971,717 A | 10/1999 | Berthold | |
| 5,983,781 A | 11/1999 | Ivantysyn | |
| 6,030,182 A | 2/2000 | Voigt | |
| 6,048,176 A | 4/2000 | Deininger | |
| 6,578,549 B1 | 6/2003 | Bordini | |
| 6,619,325 B2 | 9/2003 | Gray, Jr. | |
| 6,708,787 B2 | 3/2004 | Naruse et al. | |
| 6,708,789 B1 | 3/2004 | Albuquerque De Souza E Silva | |
| 6,712,166 B2 | 3/2004 | Rush et al. | |
| 6,719,080 B1 | 4/2004 | Gray, Jr. | |
| 6,804,957 B2 | 10/2004 | Bruun | |
| 6,820,356 B2 | 11/2004 | Naruse et al. | |
| 6,899,190 B2 | 5/2005 | Bordini | |
| 6,912,849 B2 | 7/2005 | Inoue et al. | |
| 6,922,989 B2 | 8/2005 | Nagura et al. | |
| 6,922,990 B2 | 8/2005 | Naruse et al. | |
| 6,932,733 B2 | 8/2005 | Pollman | |
| 6,959,545 B2 | 11/2005 | Lippert et al. | |
| 6,962,050 B2 | 11/2005 | Hiraki et al. | |
| 6,971,232 B2 | 12/2005 | Singh | |
| 6,973,782 B2 | 12/2005 | Rose | |
| 7,082,757 B2 | 8/2006 | Teslak et al. | |
| 7,100,723 B2 | 9/2006 | Roethler et al. | |
| 7,108,016 B2 | 9/2006 | Moskalik et al. | |
| 7,124,677 B2 * | 10/2006 | Kadlicko | 92/12.2 |
| 7,146,266 B2 | 12/2006 | Teslak et al. | |
| 7,147,239 B2 | 12/2006 | Teslak et al. | |
| 2003/0047066 A1 * | 3/2003 | Damtew et al. | 92/12.2 |
| 2004/0173396 A1 | 9/2004 | Rush et al. | |
| 2004/0251067 A1 | 12/2004 | Gray, Jr. et al. | |
| 2005/0161167 A1 | 7/2005 | Russel-Smith | |
| 2005/0161268 A1 | 7/2005 | Yang | |
| 2005/0207921 A1 | 9/2005 | Gray, Jr. | |
| 2005/0241437 A1 | 11/2005 | Gray, Jr. et al. | |
| 2006/0001314 A1 | 1/2006 | Teslak et al. | |
| 2006/0021813 A1 | 2/2006 | Gray, Jr. | |

FOREIGN PATENT DOCUMENTS

| | | |
|---|---|---|
| DE | 102005027940 A1 | 1/2006 |
| EP | 245308 B1 | 8/1991 |
| EP | 893698 A1 | 1/1999 |
| EP | 762957 B1 | 3/2001 |
| EP | 854793 B1 | 4/2002 |
| EP | 1199204 A1 | 4/2002 |
| EP | 1223066 A2 | 7/2002 |
| EP | 1228917 A1 | 8/2002 |
| EP | 1342937 A2 | 10/2003 |
| EP | 1600372 A2 | 11/2005 |
| EP | 1628028 A3 | 2/2006 |
| GB | 2386164 A | 9/2003 |
| SE | 0455864 B | 5/1988 |
| WO | WO 8702952 A1 | 5/1987 |
| WO | WO 8705574 A1 | 9/1987 |
| WO | WO 88/03123 A1 | 5/1988 |
| WO | WO 9613669 A1 | 5/1996 |
| WO | WO 9634212 A1 | 10/1996 |
| WO | WO 0013952 A1 | 3/2000 |
| WO | WO 0102715 A1 | 1/2001 |
| WO | WO 0148387 A1 | 7/2001 |
| WO | WO 0151870 A1 | 7/2001 |
| WO | WO 01/88381 A1 | 11/2001 |
| WO | WO 0243980 A2 | 6/2002 |
| WO | WO 0246621 A3 | 6/2002 |
| WO | WO 03048627 A1 | 6/2003 |
| WO | WO 03052302 A3 | 6/2003 |
| WO | WO 03106816 A1 | 12/2003 |
| WO | WO 2004025122 A1 | 3/2004 |
| WO | WO 2004033906 A1 | 4/2004 |
| WO | WO 2004081380 A2 | 9/2004 |
| WO | WO 2005014324 A3 | 2/2005 |
| WO | WO 2005061904 A1 | 7/2005 |
| WO | WO 2005068849 A1 | 7/2005 |
| WO | WO 2005075233 A2 | 8/2005 |
| WO | WO 2005087567 A1 | 9/2005 |
| WO | WO 2005088137 A1 | 9/2005 |
| WO | WO 2005095800 A1 | 10/2005 |
| WO | WO 2006006985 A1 | 1/2006 |
| WO | WO 2006/027938 A1 | 3/2006 |
| WO | WO 2006038968 A1 | 4/2006 |
| WO | WO 2006055978 A1 | 5/2006 |

* cited by examiner

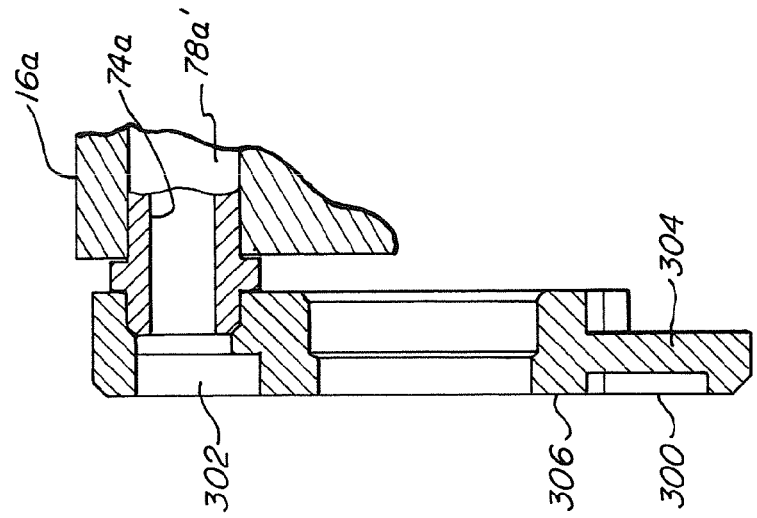
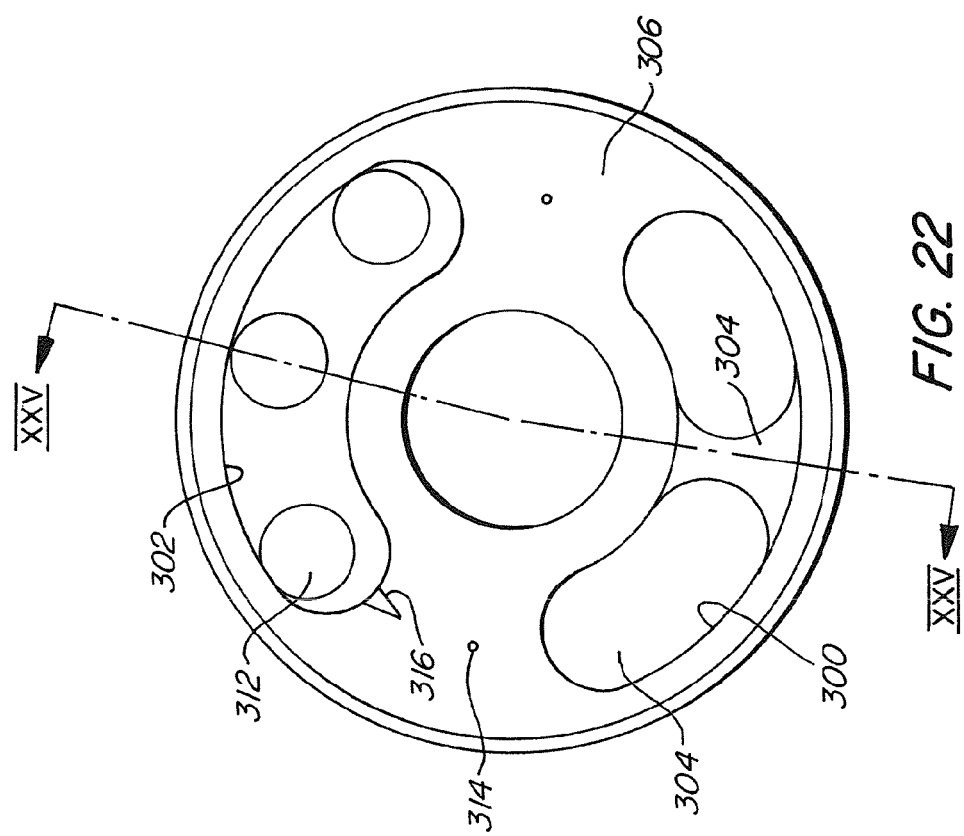

US 7,992,484 B2

ROTARY HYDRAULIC MACHINE AND CONTROLS

CROSS-REFERENCE TO RELATED APPLICATIONS

The present application is a continuation of pending International patent application PCT/US2005/004723 filed on Feb. 11, 2005 which designates the United States and claims priority from U.S. patent application Ser. No. 10/776,768 filed on Feb. 11, 2004, Ser. No. 10/776,769 filed on Feb. 11, 2004, Ser. No. 10/776,770 filed on Feb. 11, 2004, Ser. No. 10/776,771 filed on Feb. 11, 2004, and Ser. No. 10/776,772 filed on Feb. 11, 2004. This application is also a continuation-in-part of U.S. patent application Ser. No. 10/776,768 filed on Feb. 11, 2004 now U.S. Pat. No. 7,086,225, Ser. No. 10/776,769 filed on Feb. 11, 2004 now U.S. Pat. No. 7,402,027, Ser. No. 10/776,770 filed on Feb. 11, 2004 now U.S. Pat. No. 7,364,409, Ser. No. 10/776,771 filed on Feb. 11, 2004 now U.S. Pat. No. 7,124,677, and Ser. No. 10/776,772 filed on Feb. 11, 2004 now U.S. Pat. No. 7,380,490. All prior applications are herein incorporated by reference.

FIELD OF THE INVENTION

The present invention relates to hydraulic machines.

BACKGROUND OF THE INVENTION

There are many different types of hydraulic machines that can be used to convert mechanical energy into fluid energy and vice versa. Such machines may be used as a pump in which mechanical energy is converted into a flow of fluid or as a motor in which the energy contained in a flow of fluid is converted into mechanical energy. Some of the more sophisticated hydraulic machines are variable capacity machines, particularly those that utilize an inclined plate to convert rotation into an axial displacement of pistons or vice versa.

Such machines are commonly referred to as swashplate pumps or motors and have the attribute that they can handle fluid under relatively high pressure and over significant range of flows. A particular advantage of such machines is the ability to adjust the capacity of the machine to compensate for different conditions imposed upon it.

The swashplate machines are, however, relatively complex mechanically with rotating and reciprocating components that must be manufactured to withstand large hydraulic and mechanical forces. These constraints lead to a reduction in the efficiency due to mechanical and hydraulic losses, a reduced control resolution due to the mechanical inefficiencies and the required size and mass of the components and a relatively expensive machine due to the manufacturing complexity.

In use as a variable capacity machine the swashplate is modulated to achieve a desired movement of component of a machine, either a position, rate of movement or applied force. The movement of the swashplate is usually controlled by a valve supplying fluid to an actuator that acts through a compression spring on the swashplate. Control signals for the valve are generated from a set controller and a feedback, typically provided by a sensed parameter. In its simplest form the feedback may be provided by the operator who simply opens and closes the valve to achieve the desired movement or positioning of the component. More sophisticated controls however sense preselected parameters and provide feedback signals to a valve controller. The valve controller may be mechanical, hydraulic but more usually electronic to offer greater versatility in the control functions to be performed.

The control of the swashplate is determined to a large extent by the response of the system to changes of the sensed parameter. In order for effective response to be obtained, the valve must be able to supply the actuators controlling the swashplate with fluid under pressure at all times. At the same time, however, the pressure of fluid delivered by or to the machine may vary and accordingly a source of pressure at optimum conditions may not be available. The common technique to provide pressurized fluid is to use a separate charge pump but this is expensive and inefficient.

The response of the machine is also dependent on the mechanical and hydraulic losses present in the machine during its operation. A mechanically inefficient machine will not respond consistently as loads on the machine vary and the dynamics and static operating characteristics may differ significantly leading to a less predictable response.

It is therefore an object to the present invention to obviate or mitigate the above disadvantages.

SUMMARY OF THE INVENTION

In accordance with one aspect to the present invention, there is provided a rotary hydraulic machine having a housing, and a rotating group located within the housing. The rotating group includes a plurality of variable capacity chambers defined between pistons slideable within respective cylinders. The pistons are displaceable relative to the cylinders upon rotation of the barrel to vary the volume of the chambers and thereby induce a flow of fluid through the chambers from an inlet port to an outlet port as the rotating group rotates. An adjustment assembly includes an actuator operable upon the rotating group to adjust the stroke of the pistons in the cylinder and thereby adjust the capacity of the machine. A fluid supply is provided for the actuator and a control valve is interposed between the fluid supply and the actuator to control flow to the actuator. The fluid supply includes a pressurized fluid source and a hydraulic accumulator to store pressurized fluid from the source. A check valve is located between the accumulator and the source to inhibit flow from the accumulator to the source upon reduction of pressure at said source below that of said accumulator.

Preferably the control valve is a closed center valve and is movable from a centered position in which flow to and from the actuator is inhibited to a first position in which flow to the actuator from the accumulator is permitted and to a second position in which flow from the actuator to a drain is permitted.

BRIEF DESCRIPTION OF THE DRAWINGS

Embodiments of the invention will now be described by way of example only with reference to the accompanying drawings in which:

FIG. 22 is a front view of a port plate used in the embodiment of FIG. 4.

FIG. 25 is a section on the line XXV-XXV of FIG. 22.

DETAILED DESCRIPTION OF THE INVENTION

Figure 1:
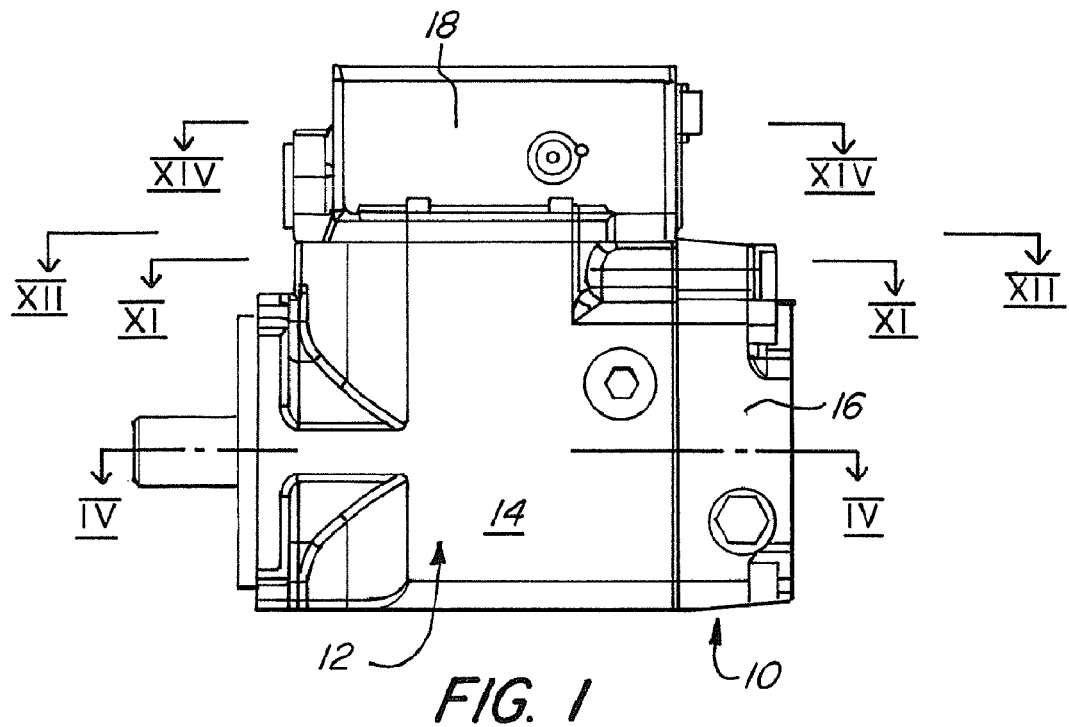
FIG. 1 is a side elevation of a hydraulic machine.
Figure 2:
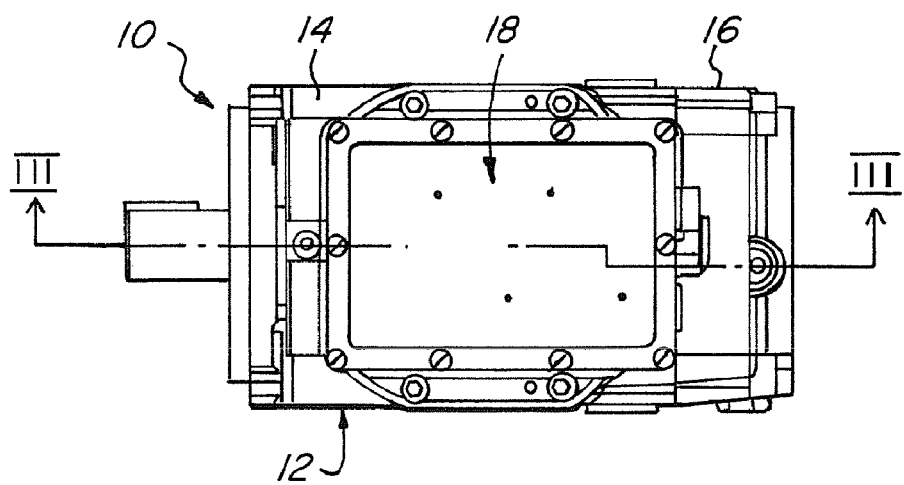
FIG. 2 is a top view of the hydraulic machine of FIG. 1.
Figure 3:
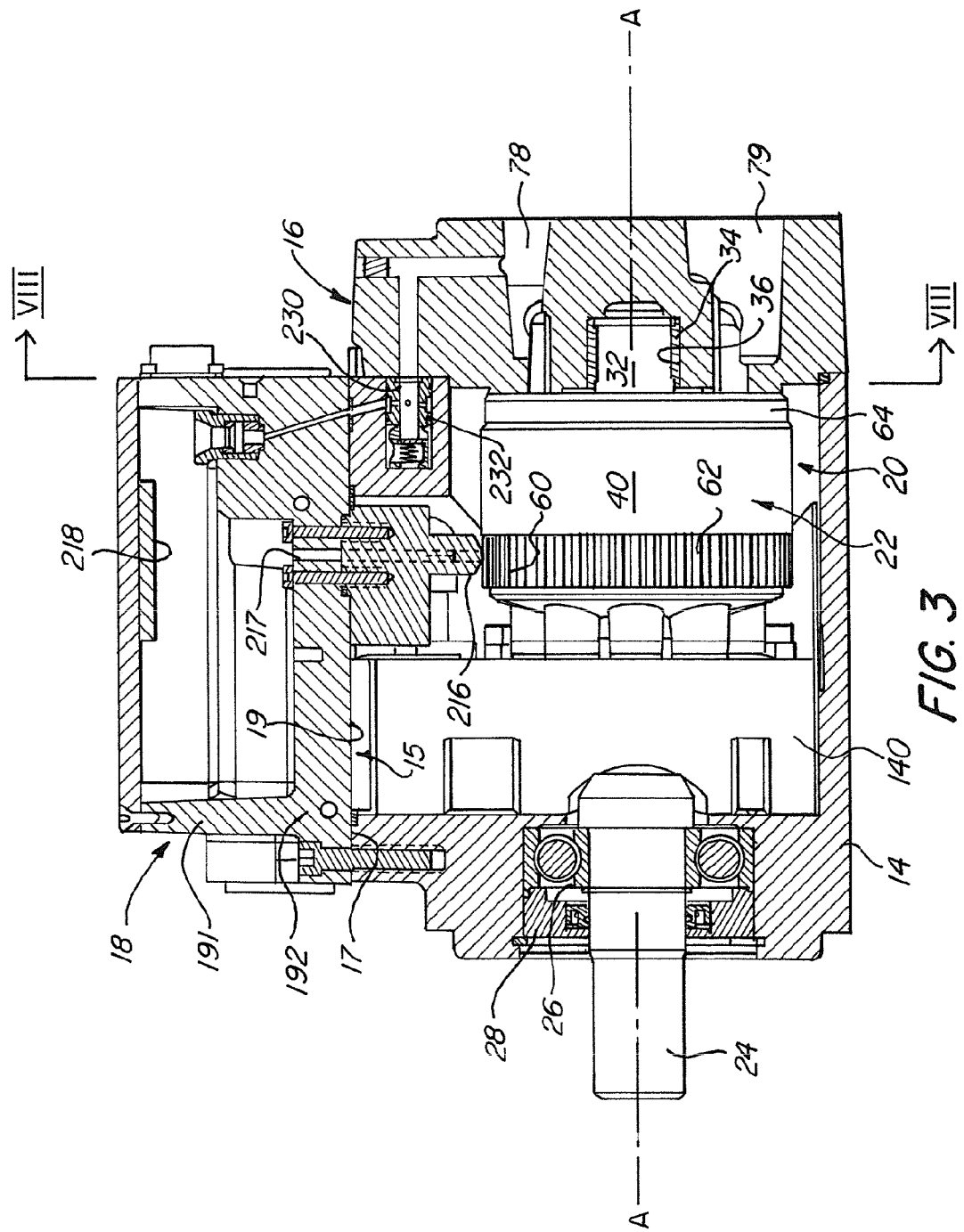
FIG. 3 is a view on the line III-III of FIG. 2.
Figure 4:
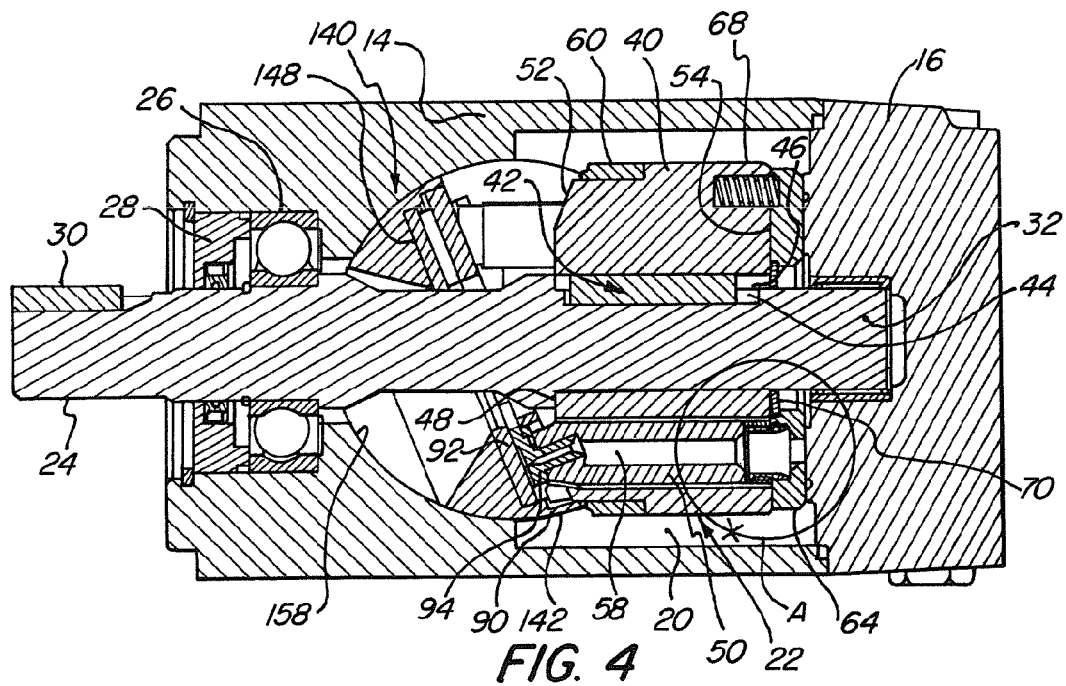
FIG. 4 is a view on the line IV-IV of FIG. 1.

Referring therefore to FIGS. 1 through 4, a hydraulic machine 10 includes a housing 12 formed from a casing 14, an end plate 16 and a control housing 18. The casing 14 has an opening 15 on its upper side with a planar sealing surface 17 around the opening 15. The control housing 18 has a lower surface 19 that extends across the opening 15 and is secured to the casing 14. The control housing 18, end plates 16 and casing 14 define an internal cavity 20 in which the rotating group 22 of the machine 10 is located.

As can be seen in FIGS. 3, 4, 5 and 6, the rotating group 22 includes a drive shaft 24 that is rotatably supported in the casing 14 on a roller bearing assembly 26 and sealed with a seal assembly 28. One end of the drive shaft 24 projects from the casing and includes a drive coupling in the form of a key 30 for connection to a drive or driven component (not shown) e.g. an engine, electric motor or wheel assembly. The opposite end 32 of the drive shaft 24 is supported in a roller bearing 34 located in a bore 36 of the end plate 16. The shaft 24 is thus free to rotate along a longitudinal axis A-A of the housing 12.

A barrel 40 is secured to the shaft 24 by a key 42 located in a key way 44 formed in the shaft 24. The barrel 40 similarly has a key way 46 that allows the barrel 40 to slide axially onto the shaft 24 and abut against a shoulder 48 formed on a drive shaft 24. The barrel 40 is provided with a set of axial bores 50 uniformly spaced about the axis of the shaft 24 and extending between oppositely directed end faces 52, 54. As can be seen in greater detail in FIG. 9, each of the bores 50 is lined with a bronze sleeve 56 to provide a sliding bearing for a piston assembly 58, described in greater detail below.

A toothed ring 60 is secured on the outer surface of the barrel 40 adjacent the end face 52. The toothed ring 60 has a set of uniformly spaced teeth 62 each with a square section and is a shrink fit on the barrel 40. The barrel 40 is formed from aluminum and the toothed ring 60 from a magnetic material. The barrel 40 has reduced diameter adjacent to the ring 60 so that the teeth 62 project radially from the surrounding surface of the barrel 40.

A port plate 64 is located adjacent to the end face 54 and has a series of ports 66 at locations corresponding to the bores 50 in the barrel 40. The port plate 64 is located between the barrel 40 and the end plate 16 and is biased into engagement with the end plate 16 by coil springs 68 and a conical washer 70. The coil springs 68 are positioned at the radially outer portion of the barrel 40 and between adjacent bores 50 to bias the radially outer portion of the plate 64 into engagement with the end plate 16. As seen more clearly in FIG. 9, the conical washer 70 is located at the radially inner portion of the barrel 40 and its radially outer edge received in a recess 72 formed in the port plate 64 to urge the inner portion against the end plate 16. The port plate 64 is thus free to float axially relative to the barrel 40.

Figure 9:
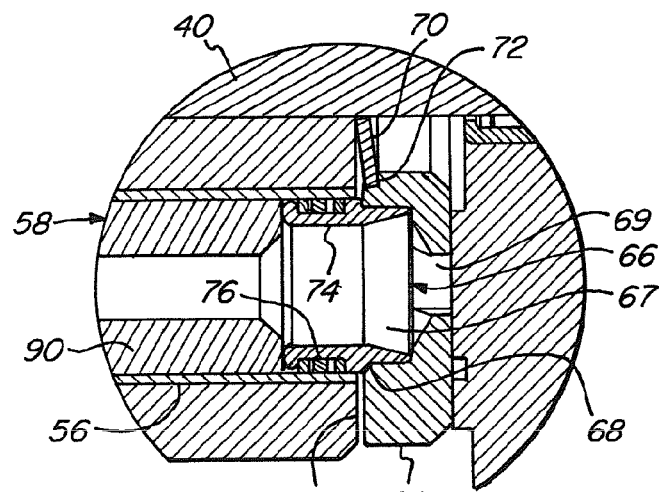
FIG. 9 is an enlarged view of the portion of the machine shown in FIG. 4 within the circle A.
Figure 5:
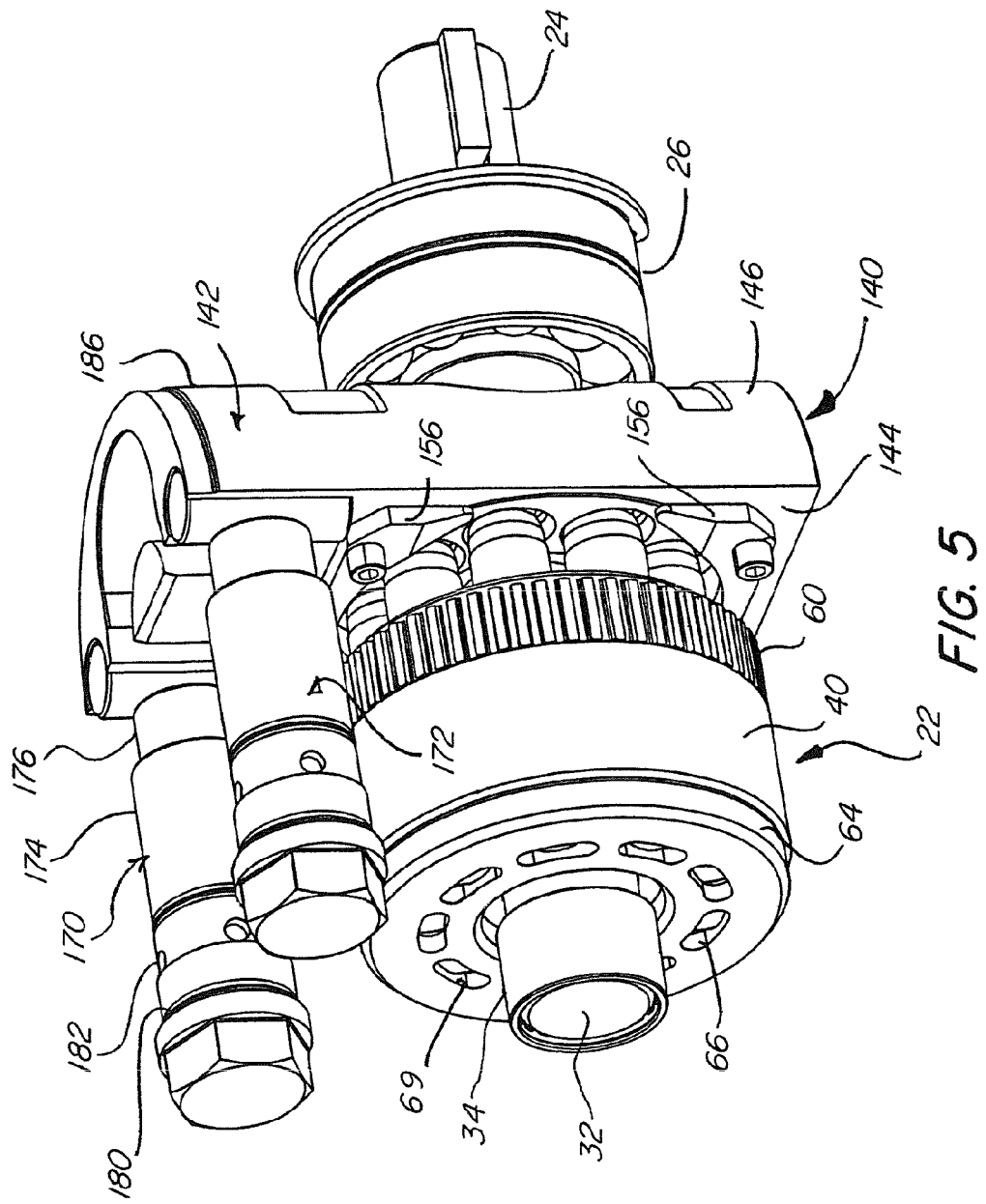
FIG. 5 is a perspective view of the rotating components of the machine shown in FIGS. 3 and 4.
Figure 6:
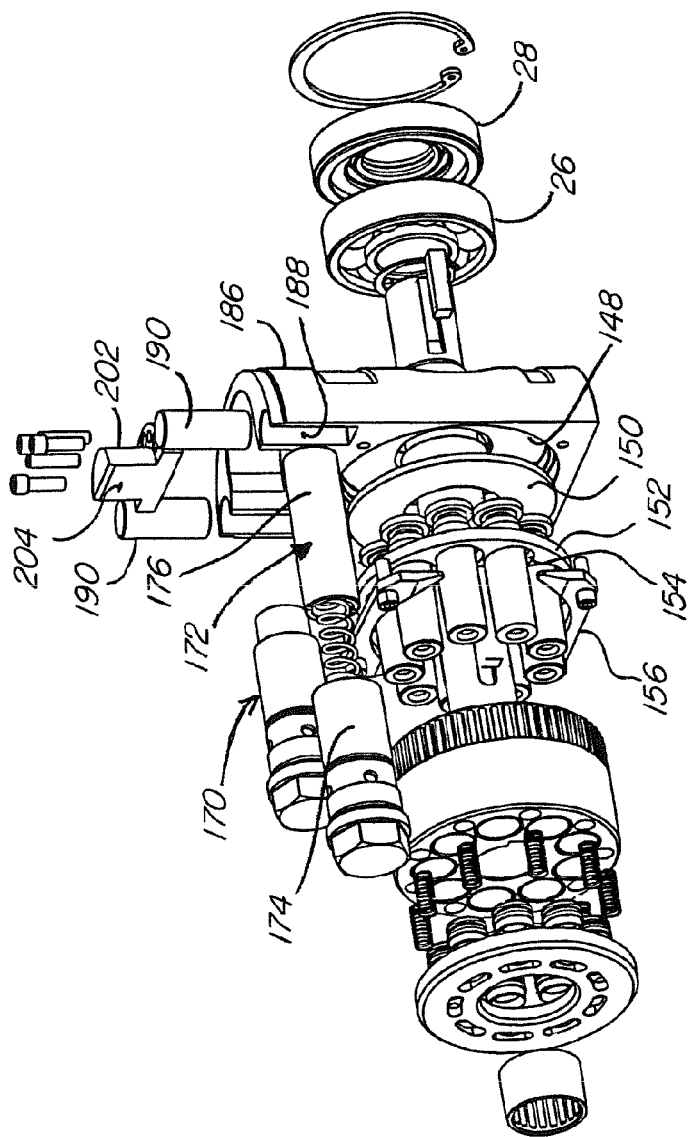
FIG. 6 is an exploded perspective view of the component shown in FIG. 5.

To provide fluid transfer between the bores 50 and the ports 66, an annular sleeve 74 is located within each of the bores 50 and sealed by an O-ring 76. The opposite end of the sleeve 74 is received in the circular recess 67 of the port 66, as best seen in FIG. 9, and is located axially by a shoulder 68 provided on the sleeve 74. A fluid tight seal is thus provided between the barrel 40 and the port plate 64. The ports 66 smoothly transform from a circular cross-section facing the bore 50 to an arcuate slot for co-operation with conduits 78, 79 formed in the end plate 16.

Figure 8:
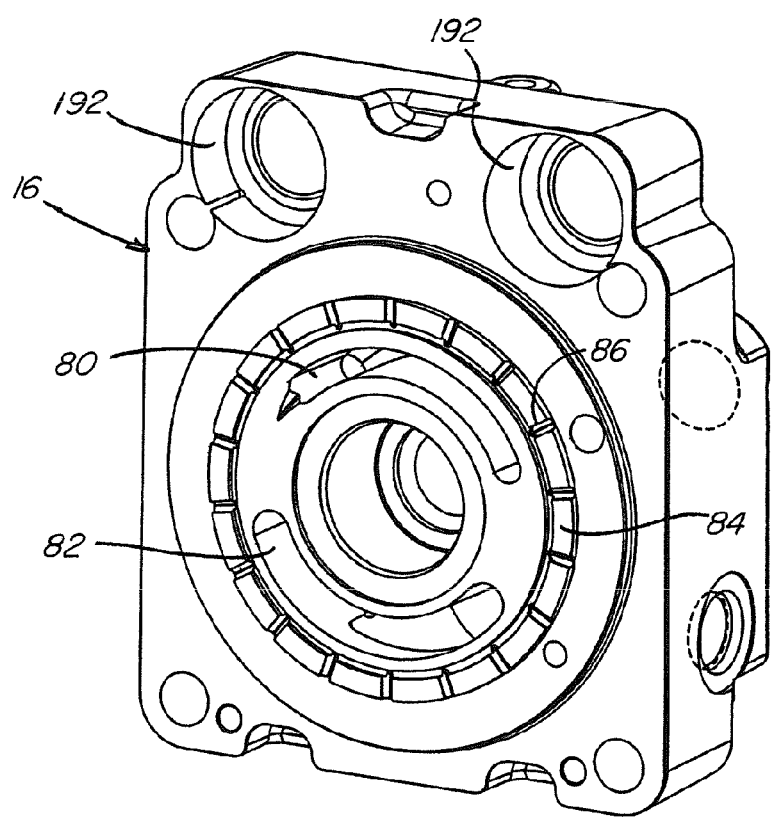
FIG. 8 is a perspective view of a portion of the machine in the direction of arrow VIII-VII of FIG. 3.

As most readily seen in FIG. 8, the end plate 16 has a pair of kidney ports 80, 82 disposed about the bore 36. The kidney ports 80,82 connect pressure and suction conduits 78, 79 respectively to fluid entering and leaving the bores 50. The end plate 16 has a circular bearing face 84 that is upstanding from the end plate 16 and has a set of radial grooves 86 formed in a concentric band about the axis of the shaft 24. The grooves 86 provide a hydro-dynamic bearing between the port plate 64 and the bearing face 84 in order to maintain a seal whilst facilitating relative rotation between the port plate 64 and face 84.

Referring again to FIGS. 4 and 9, each of the piston assemblies 58 is axially slideable within a respective sleeve 56 and comprises a tubular piston 90 and a slipper 92 interconnected by a ball joint 94. The piston 90 is formed from a tube that is heat treated and ground to diameter to be a smooth sliding fit within the sleeves 56. As can be seen in greater detail in FIG. 10, the outer surface of one end 96 of the piston 90 is reduced as indicated at 98 and a part spherical cavity 100 formed on the inner walls of the end 96. The cavity 100 is dimensioned to receive a ball 102 with a through bore 104. The cavity 100 has an axial depth greater than the radius of the ball 102 so that the inner walls extend beyond the equator of the ball 102. The bore 104 in ball 102 is stepped as indicated at 106 to provide an increased diameter at its inner end.

During the first step of forming of the piston assembly 58, indicated at 109, the ball 102 is inserted in the cavity 100 with the bore 104 aligned generally with the axis of the piston 90. To retain the ball 102 in the cavity 100, the reduced section 98 of the piston 90 at the end 96 is swaged about the ball 100 indicated in FIG. 10(b).

Slipper 92 that has a stem 110 and a base 112 is inserted into the bore 104 (step (c)). A passageway 114 is formed through the stem 110 to communicate between the interior of the piston 90 and a recess 116 formed in the base 112. The slipper 92 is secured to the ball 102 by swaging, the end of the stem 110 so it is secured by the step 106, as shown in step (d).

Figure 10:
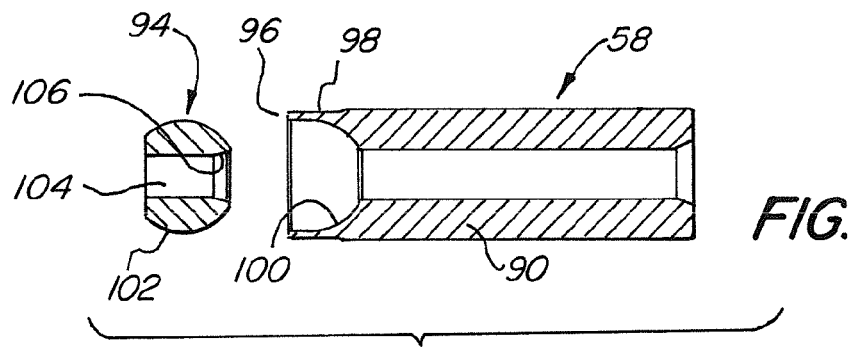
FIG. 10 is a schematic representation of the assembly of a set of components used in the machine of FIGS. 4 and 5.
Figure 10A:
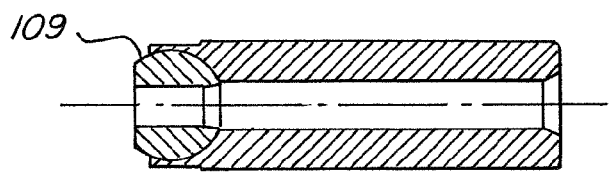
Figure 10B:
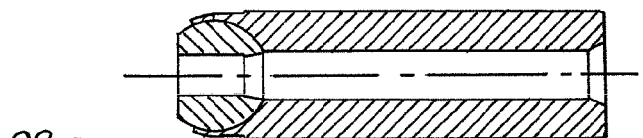
Figure 10C:
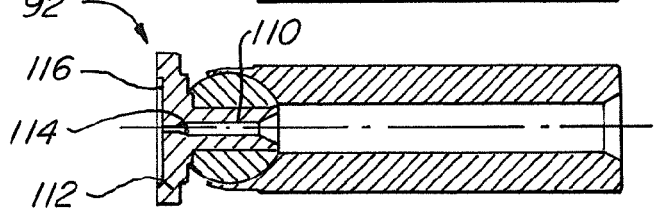
Figure 10D:
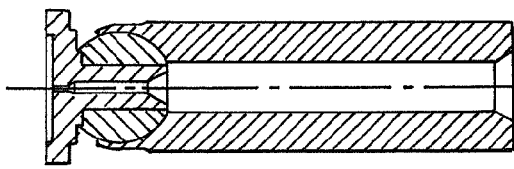
Figure 10E:
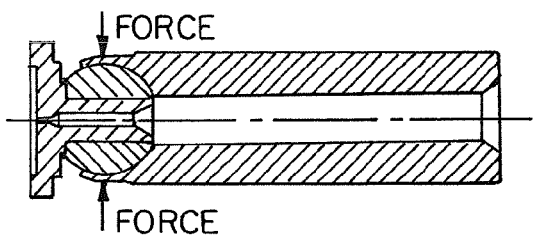

After securing the slipper to the ball, a radial force is applied to the equator of the ball as indicated by the arrows F in FIG. 10e that has the effect of displacing the material on the equator to provide a small clearance between the ball 102 and cavity 100. This clearance enables the ball joint 94 to rotate smoothly within the cavity 100 whilst maintaining an effective seal from the interior of the piston.

Figure 18:
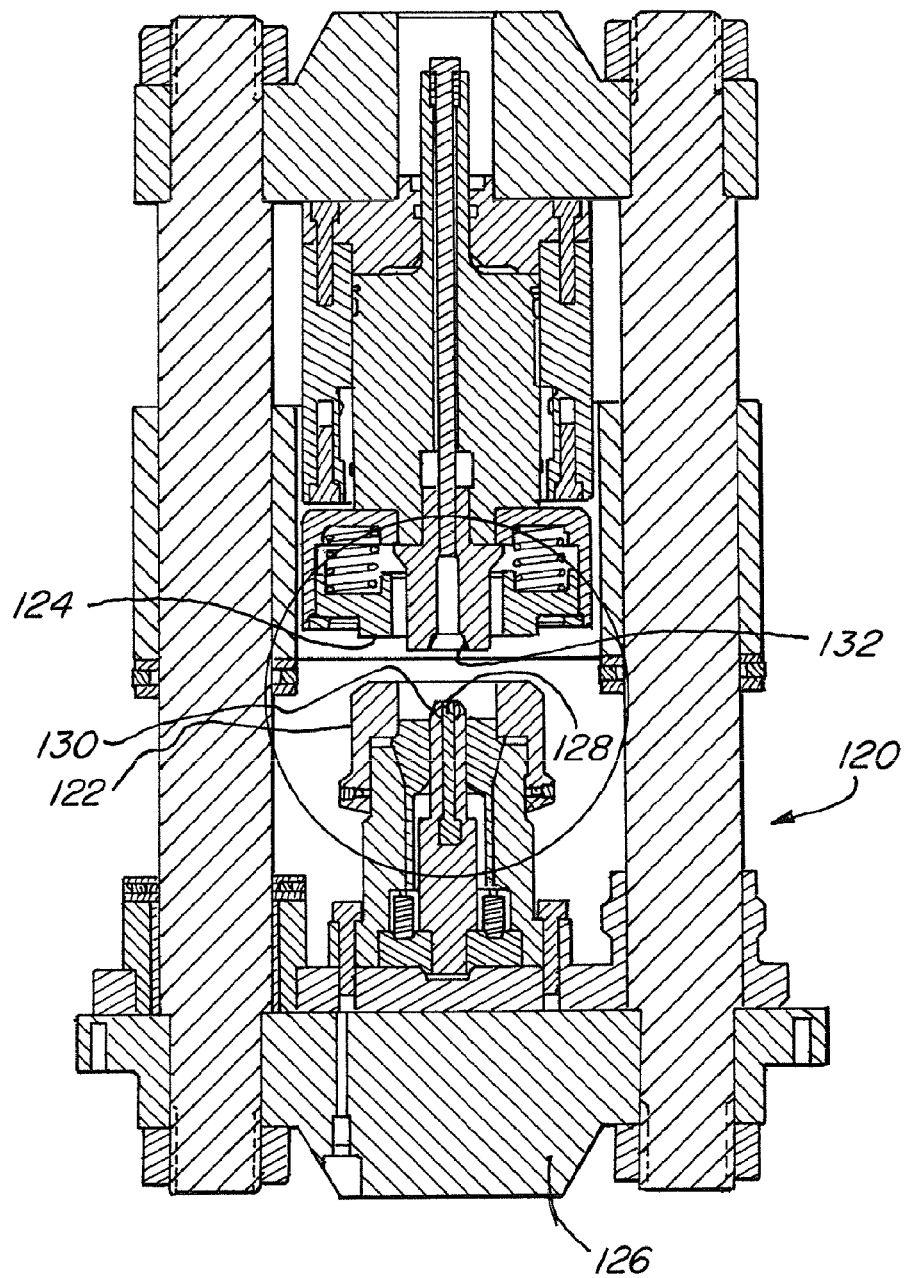
FIG. 18 is a section through a tool used to assemble the components shown schematically in FIG. 10.
Figure 19:
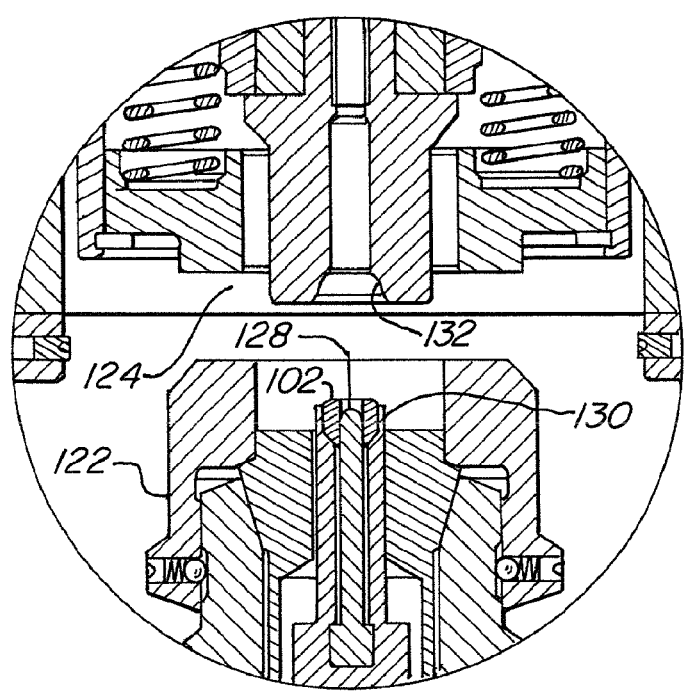
FIG. 19 is a detailed view of a portion of the tool shown in FIG. 18.
Figure 20:
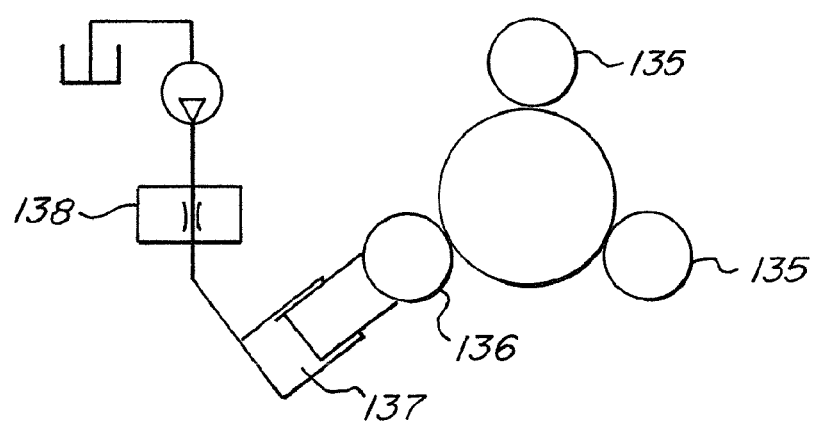
FIG. 20 is a plan view of a further tool used to assemble the components shown in FIG. 10.
Figure 21:
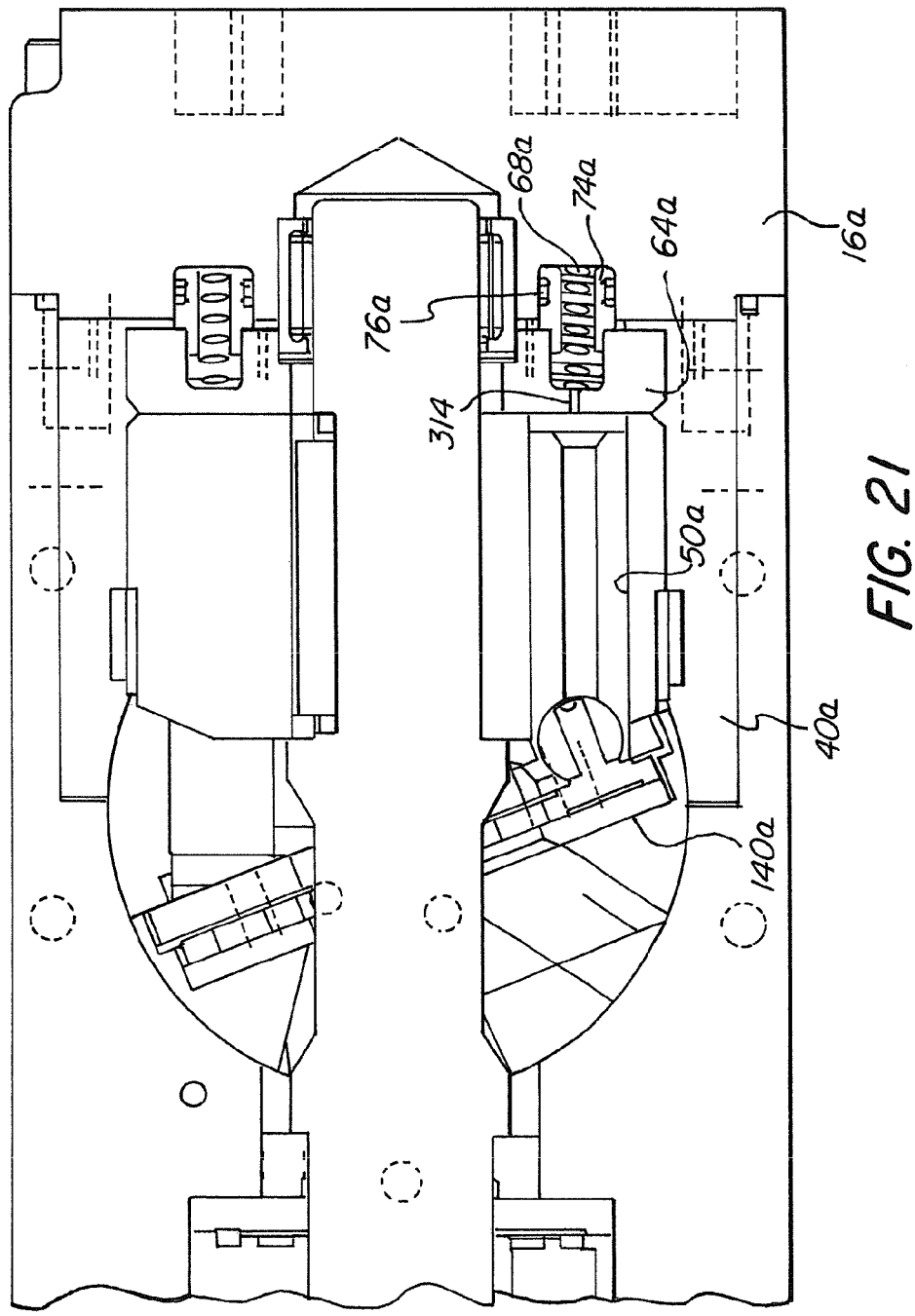
FIG. 21 is a view similar to FIG. 4 of an alternative embodiment of machine.

The process shown in FIG. 10 may conveniently be performed using the tool set shown in FIGS. 18, 19 and 20. A tool set 120 has a fixed die 122 and a movable die 124. The fixed die 122 is secured to a base plate 126 and has a central pin 128 on which the piston 90 is located. A supporting sleeve 130 supports the upper end of the piston 90 adjacent to the reduction 98. The pin 128 also aligns the ball 102 by extending into the bore 104 of the ball 102.

The movable die 124 is formed with a part spherical recess 132 dimensioned to engage the end 96 and form it about the ball 102. The movable die may be advanced into engagement with the ball 102 through the action of a press in which the tool set 120 is mounted.

After forming, the piston assembly 58 is inserted into a 3 disk die 134 shown in FIG. 20. The 3 disk die has a pair of driven rollers 135 and an idler roller 136 that are disposed around the circumference of the end 96 of the piston assembly 58 to form point contact with the outer surface 98. The idler roller 136 is movable along a radial path by means of a hydraulic cylinder 137 that applies a constant force to the roller 136. The advance of the roller is controlled by a flow control valve 138 until the material surrounding the equator of the ball 102 is sufficiently displaced to provide free movement of the ball within the cavity.

Referring again to FIGS. 4, 5 and 6 of the base 112 of the slipper 92 engages a swashplate assembly 140 supported within the housing 14. The swashplate assembly 140 includes a semi cylindrical swashplate 142 having a generally planar front face 144 and an arcuate rear face 146. The planar front face 144 has a recess 148 to receive a lapped plate 150 against which the slippers 92 bear. The slippers 92 are held against the plate 150 by a retainer 152 that has holes 154 through which the piston assemblies 58 project. The holes 154 are dimensioned to engage the outer periphery of the base 112 of the slipper 92 and inhibit axial movement relative to the plate 150. The retainer 152 is located axially by a pair of C-shaped clamps 156 that are secured to the front face 144 of the swashplate 142. The base 112 thus bears against the lapped face of the plate 150, as the barrel is rotated by the drive shaft 24.

The rear face 146 of the swashplate 142 is supported on a complimentary curved surface 158 of the casing 14 opposite the end plate 16. The rear face 146 is coated with a polymer to reduce friction between the face 146 and surface 158. A suitable polymer coating is a nylon coating formulated from type 11 polyamide resins, such as that available from Rohm & Haas under the trade name CORVEL. A 70 000 series has been found suitable although other grades may be utilized depending on operating circumstances. After deposition on the face 146, the coating is ground to a uniform thickness of approximately 0.040 inches. Alternatively, it has been found satisfactory to harden the face 146 and apply a TEFLON™ coating.

Figure 7:
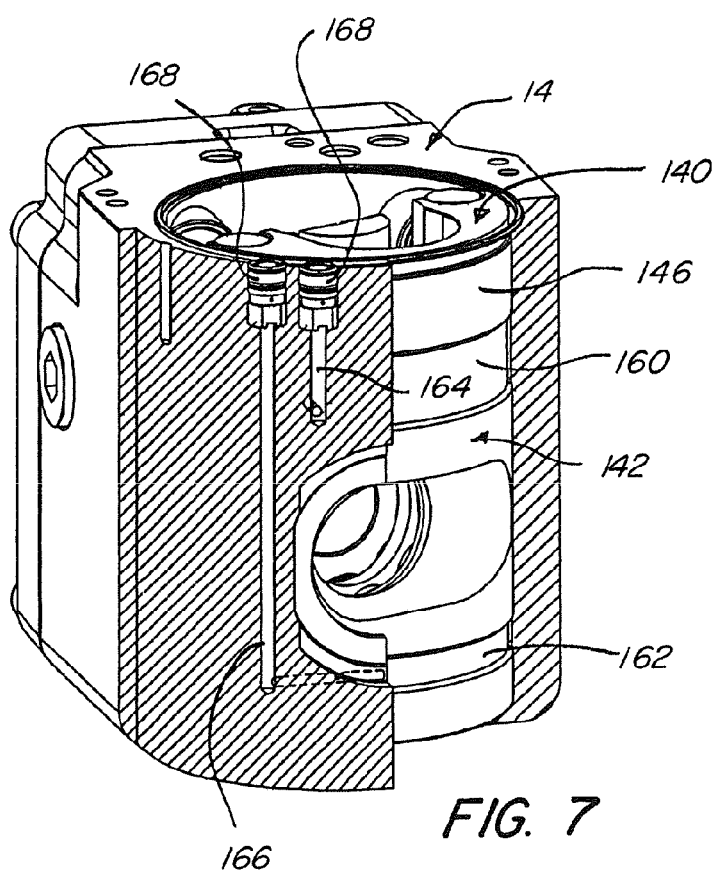
FIG. 7 is a front perspective view, partly in section of the assembly shown in FIG. 3.

As seen in FIG. 7, a pair of grooves 160, 162 respectively are formed in the rear face 146 and terminate prior to the linear edges of the face 146 to provide a pair of closed cavities. The grooves 160, 162 are generally aligned with the kidney ports 80, 82 formed in the end plate 16 and it will be noted that the width of the groove 160 which is aligned with the pressure conduit is greater than the width of the groove 162 aligned with the suction conduit. Fluid is supplied to the grooves 160, 162 through internal passageways 164, 166 respectively formed in the casing 14. Flow through the passageways is controlled by a pair of pressure compensated flow control valves 168 that supply a constant flow of fluid to the grooves 160, 162. The grooves 160, 162 thus provide a fluid bearing for the rear face 146 against the surface 158 to facilitate rotational movement of the swashplate 142.

Figure 11:
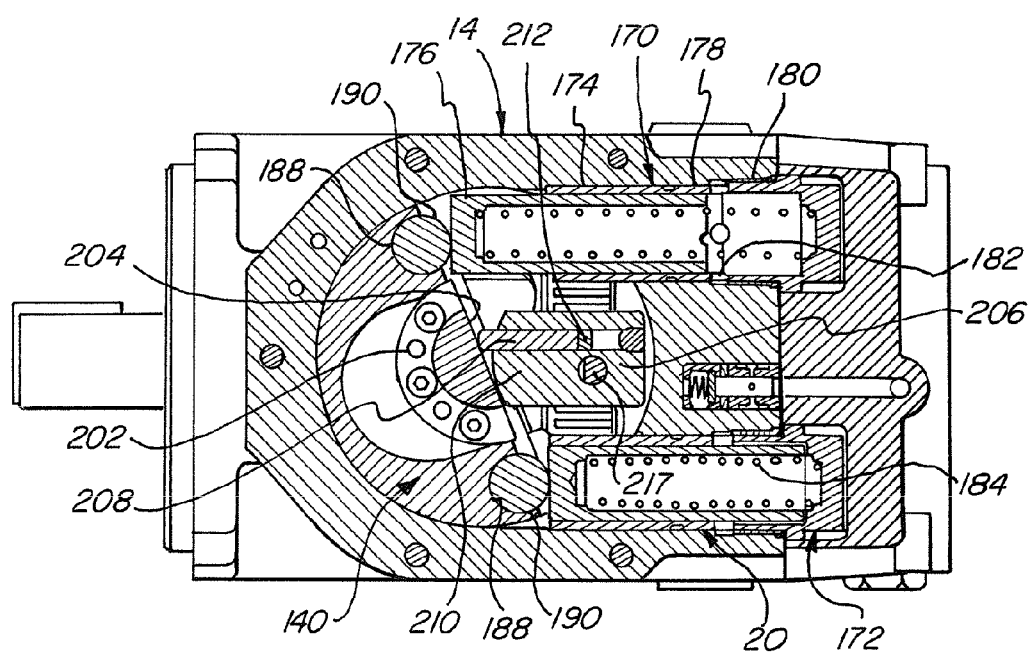
FIG. 11 is a view on the line XI-XI of FIG. 1.

Adjustment of the swashplate 142 about its axis of rotation is controlled by a pair of actuators 170, 172 respectively located in the casing 14. As shown most clearly in FIGS. 5 and 11, each of the actuators 170, 172 includes a cylinder 174 in which a piston 176 slides. Each of the cylinders 174 is received within a bore 178 formed in the casing 14 and extending from the end plate 16 into the cavity 20. The cylinders 174 have an external thread 180 which engages with an internal thread on the bore 178 to secure the cylinder in the casing 14. The end plate 16 (FIG. 8) has a pair of recesses 192 that fit over the end of the pistons 176. The self contained actuator, 170, 172 located in the casing 14 ensures that axial load generated by the actuators 170 are imposed on the casing 14 rather than across the joint between the end plate 16 and casing 14 to maintain integrity of the housing 12. To avoid distortion of the cylinders 174 during assembly, it has been found preferable to form the cylinder 174 as two components, namely a body 174a which is located in the bore 178 by a shoulder and an end cap 174b carrying the threads 180. The cap 174b bears against the end of the body 174a to hold it in the bore 178.

Figure 12:
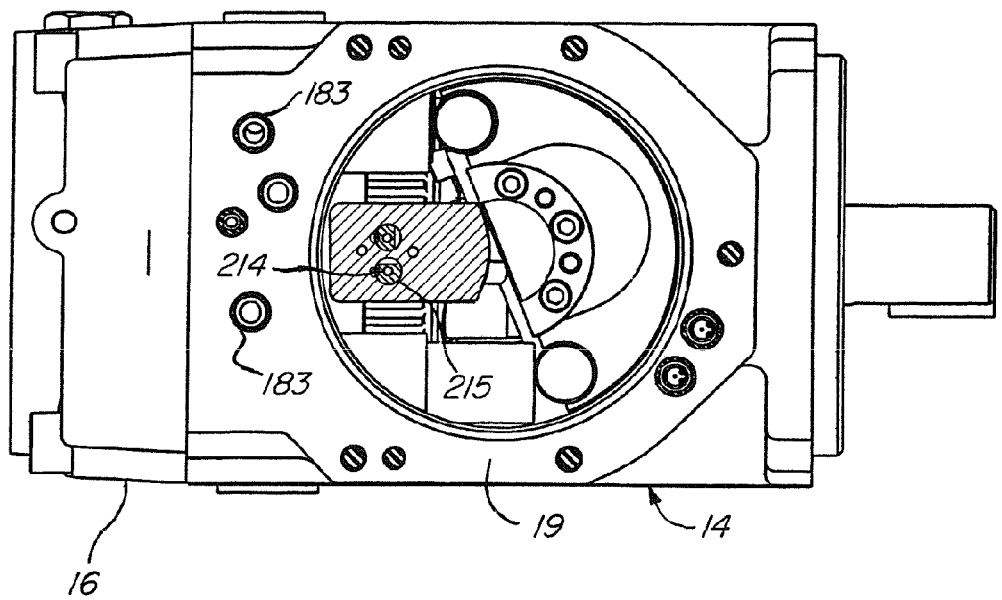
FIG. 12 is a top view on the line XII-XII of FIG. 1.

The cylinder 174 is provided with cross drillings 182 to permit fluid supplied through internal passageways 183 (FIG. 12) in the housing 14 to flow to and from the interior of the cylinder 174. A spring 184 acts between the cylinder 174 and piston 176 to bias it outwardly into engagement with the swashplate assembly 140. Preferably one of the springs 184 has a greater axial force than the other so that the swashplate is biased to a maximum strike position in the absence of fluid in the actuators 170, 172.

The actuators 170, 172 bear against a horseshoe extension 186 of the swashplate 142 that projects outwardly above the barrel 40. The extension 186 has a pair of part cylindrical cavities 188 at opposite ends into which a cylindrical pin 190 is located. The cavities 188 are positioned such that the outer surface of the pin 190 is tangential to a line passing through the axis of rotation of the swashplate. The end face of piston 176 engages the outer surface of the pin 190 to control the position of the swashplate.

Figure 13:
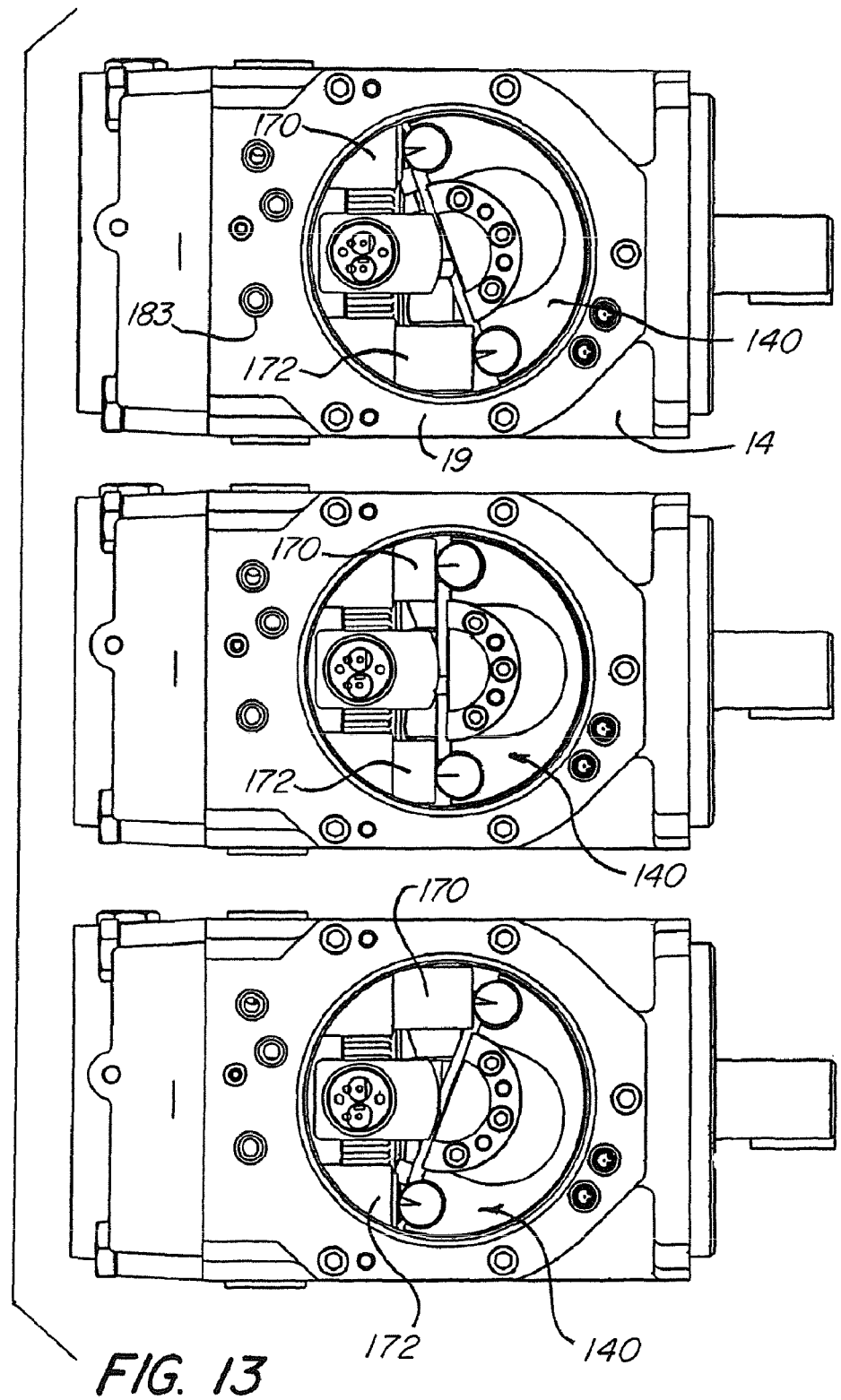
FIG. 13 is a view similar to FIG. 12 showing alternate positions of the components of the machine shown in FIGS. 4 and 5.

As illustrated in FIG. 13, extension of the piston 176 of one of the actuators 170, 172 will induce rotation of the swashplate assembly 140 in the casing 14 and cause a corresponding retraction of the other of the actuators 170, 172. The assembly 140 slides over the curved surface 158 and as the assembly 140 rotates, the pins 190 maintain contact with the end face of the pistons 170. The position of the pins 190 on a common diameter of the swashplate assembly ensures that a rolling motion, rather than sliding, is provided across the end face of the pistons 176 to reduce friction during the adjustment. As can be seen in FIG. 13, the actuators 170, 172 are disposed to provide a full range of rotation on both sides of a neutral or no stroke position with rolling contact being made over this range of motion.

Figure 14:
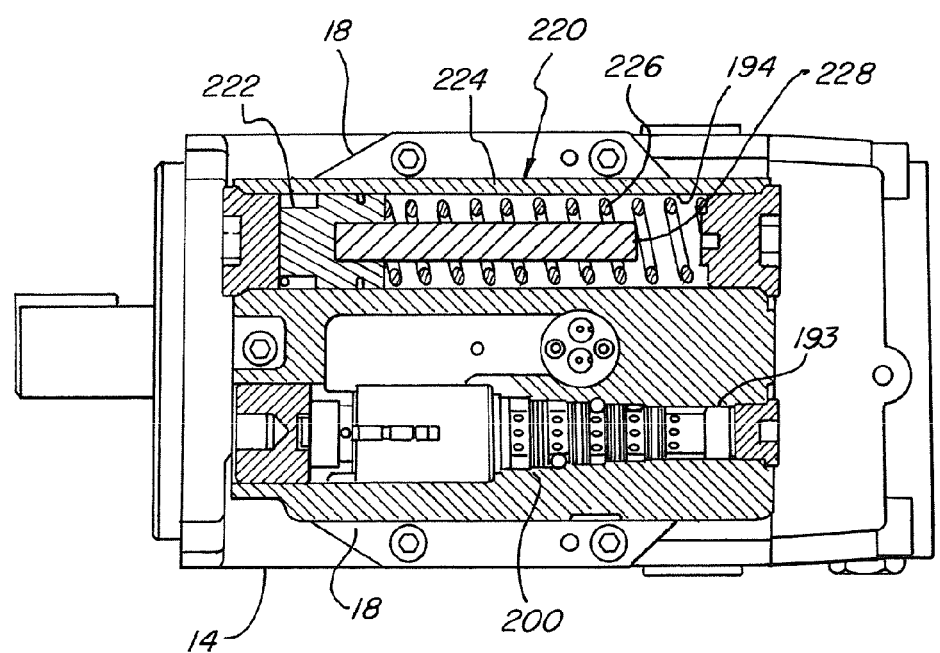
FIG. 14 is a view on the line XIV-XIV of FIG. 1.
Figure 15:
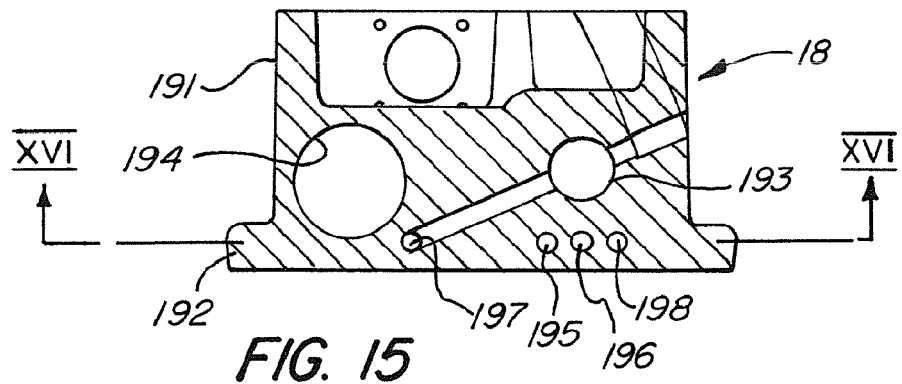
FIG. 15 is a section on line XV-XV of FIG. 3.
Figure 16:
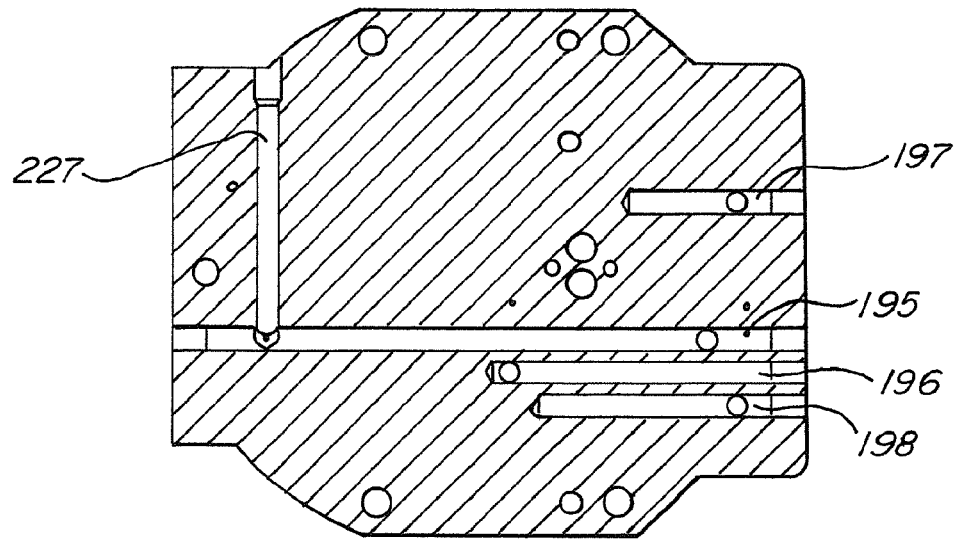
FIG. 16 is a view on the line XVI-XVI of FIG. 15.
Figure 17:
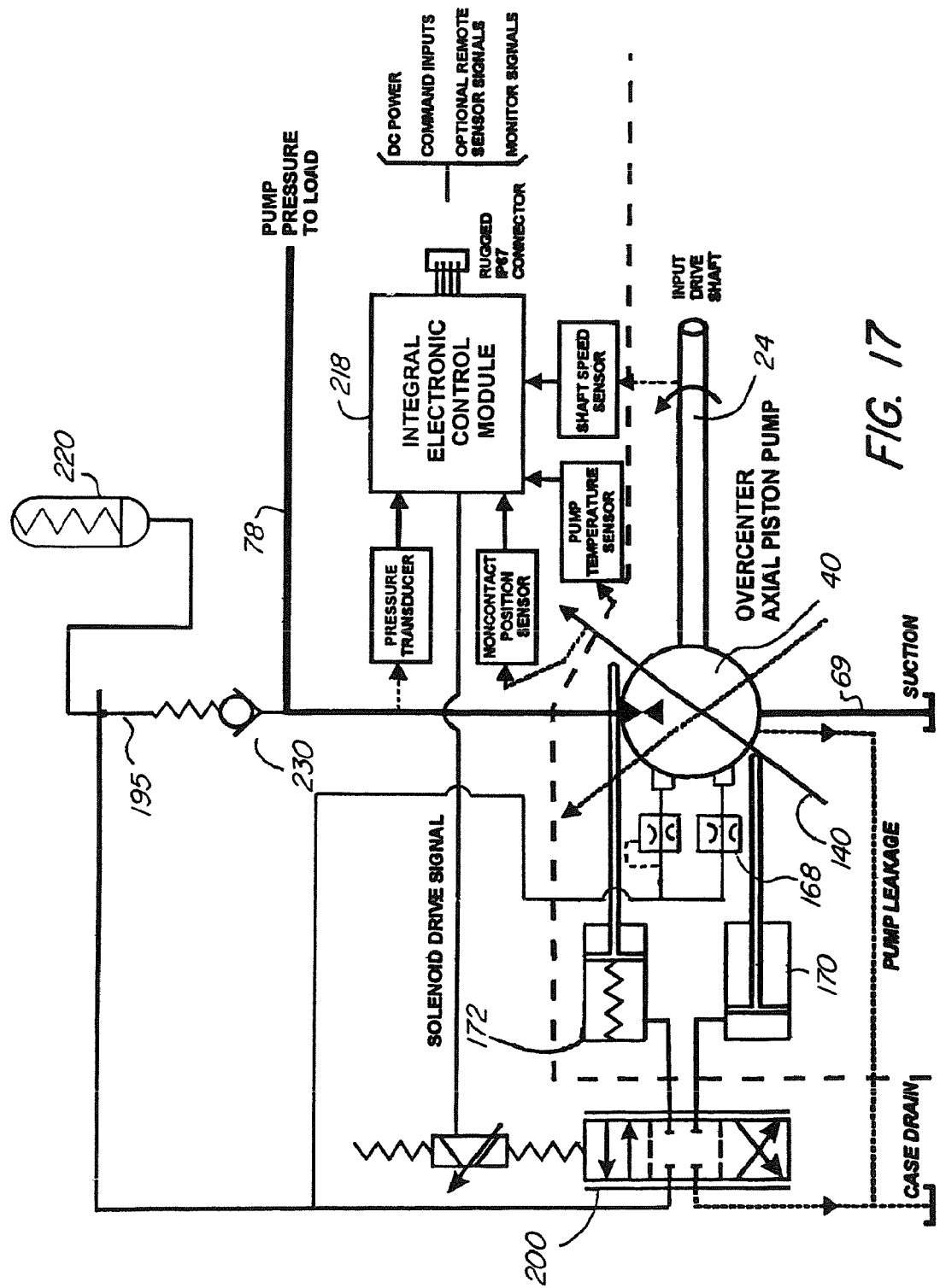
FIG. 17 is a schematic hydraulic circuit showing the operation of the components shown in FIG. 1 to 16.

Flow to the actuators 170, 172 is controlled by a control valve 200, FIG. 14, located in the control housing 18. The control valve 200 is a solenoid operated, spool valve having a centered position in which no flow is permitted through the valve. The spool may be moved to either side of the centered position to apply pressure to one of the actuators and connect the other actuator to drain. The control housing 18 is shown in greater detail in FIGS. 3, 15 and 16 has a peripheral skirt 191 extending from a base 192. A pair of bores 193, 194 extend through the base 192 to receive control valve 200 and an accumulator 220 respectively. Fluid is supplied to the bores 193, 194 by an internal supply gallery 195 and a drain gallery 196 is connected between the bore 193 and the cavity 20 of the casing 12. Internal galleries 197, 198 also communicate between the bore 193 and the internal passageways 183 connected to actuators 170, 172. The valve 200 controls the flow from the internal supply gallery 196 to the actuators and drain as will be described below.

The fluid flow controlled by the control valve 200 is obtained from the pressure conduit 78 and supplied through an accumulator 220 located in the bore 194 of control housing 18 adjacent to the control valve 200. The accumulator, shown in FIG. 14, includes a piston 222 slideable within a cylinder 224 and biased by a spring 226 to a minimum volume. The piston 222 has a seal 223 and carries a stop 228 that limits displacement of the piston 222 within the cylinder 224. The piston 222 may be formed in two pieces to facilitate insertion of the seal 223. The stop 228 in combination with the spring 226 effectively establishes a maximum stored pressure for the accumulator 220. The supply gallery 195 extends through a branch conduit 227 to the interior of cylinder 224 and is connected with the pressure conduit 78 through a check valve 230 located in an internal bore 232 in the housing 14. The check valve 230 ensures that the pressure fluid in the accumulator 220 is maintained as the pressure supplied to conduit 78 fluctuates and that control fluid is available to the valve 200. The supply gallery 195 is also connected to the pressure compensated flow control valves 168 to ensure a constant flow of fluid to the bearings 160, 162.

To provide control signals to the valve 200, a block 202 is secured to the swashplate 142 within the horseshoe extension 186 and presents a planar surface 204. A position sensor 206 engages the planar surface 204 eccentrically to the axis of rotation of the swashplate assembly 140 to provide a signal indicative of the disposition of the swashplate assembly 140. The position sensor 206 includes a pin 208 slideable within a sensing block 210 that extends downwardly from the control housing 18. The pin 208 is formed from a stainless steel so as to be non-magnetic and has a magnet 212 inserted at its inner end. The sensing block 210 accommodates a Hall effect sensor 214 in a vertical bore 215 where it is sealed to prevent migration of oil from the cavity 20 to the control housing 18. The sensor 214 provides a varying signal as the pin 208 moves axially within the block 210. The Hall effect sensor thus provides a position signal that varies as the swashplate is rotated by the actuators 170, 172.

The sensing block 210 also carries a further Hall effect sensor 216 located in a bore 217 extending through the block 210 to a nose 219 positioned adjacent to the toothed ring 60. The sensor 216 is sealed in the bore 217 and provides a fluctuating signal as the teeth 62 pass it so that the frequency of the signal is an indication of rotational speed of the barrel 22. The control signals obtained from the Hall effect sensors 214 and 216 are supplied to a control circuit board 218 located within the control housing 18. Further input signals, such as a set signal from a manual control, a temperature signal indicating the temperature of fluid in the machine, and a pressure signal indicating the pressure of-fluid in the pressure conduit 78, are obtained from transducers located in or adjacent to the conduits 78, 80. The input signals are, also fed to the control circuit board 218 which implements a control algorithm using one or more of the set, pressure, temperature and flow signals fed to it. The output from the control circuit board 216 is provided to the control valve 200 which is operable to control the flow to or from the actuators 171, 172 in response to the control signal received.

The operation of the machine 10 will now be described. For the purpose of the description it will be assumed that the machine is functioning as a pump with the shaft 24 driven by a prime mover such as an electric motor or internal combustion engine. Initially, the bias of the springs has moved the swashplate 140 to a position of maximum stroke and fluid in the accumulator 220 has discharged through the flow control valves 168. Rotation of the shaft 24 and barrel 40 causes full stroke reciprocation of the pistons 58 as the slippers 92 move across the lapped plate 150 to discharge fluid into the pressure port 78. The fluid is delivered through the check valve 230 to the supply gallery 195 to provide fluid to the control valve 200 and charge the accumulator 220.

In its initial condition, the control is set to move, the swashplate assembly 140 to a neutral or no-flow position. Accordingly, as fluid is supplied to the control valve 200, it is directed to the actuator 170 to move the swashplate 140 to the neutral position. As the swashplate moves toward the neutral position, the pin 208 of position sensor 206 follows the movement and adjusts the position signal provided to the board 218. Upon attainment of the neutral position, the flow to the actuator 170 is terminated by the valve 200. In this position, the barrel 22 is rotating but the piston assembly 58 is not reciprocating within the barrel. The accumulator 220 is charged to maintain supply to the flow control valves 168 through the gallery 195, and to the control valve 200.

After initialization, the circuit board 218 receives a signal indicating a movement of the swashplate assembly 140 to a position in which fluid is supplied to the pressure port 78. The signal may be generated from the set signal, such as a manual operator, or from a pressure sensing signal and results in a control signal supplied to the valve 200. The valve 200 is moved to a position in which it supplies fluid to the actuator 170 and allows fluid from the actuator 172 to flow to a sump. The supply fluid to the actuator 170 causes the piston 176 to extend and bear against the pin 190. The internal pressure applied to the piston 176 causes rotation of the swashplate assembly 140 with the surface 146 sliding across the surface 158. Until such time as pressure is delivered to the pressure port 78, the pressurized fluid is supplied from the accumulator 220 through the control valve and into the interior of the actuator 170 to induce the rotation. As the swashplate assembly is rotated about its axis, the slippers 92 are retained against the lapped plate 150 and the stroke of the pistons 90 is increased. Fluid is thus drawn through the suction port 69 past the kidney port 82 and into the pistons as they move outwardly from the barrel. Continued rotation moves the pistons into alignment with the pressure port 78 and expels fluid from the cylinders as the pistons 90 move into barrel. The pressure supplied to the port 78 is also delivered to the internal supply galleries 195 to replenish the accumulator 220.

As the swashplate rotates, the pin 208 follows the movement of the planar surface 204 and provides a feedback signal indicative of the capacity of the barrel assembly 22. The signal from the toothed ring 60 also provides a feedback signal indicative of rotation so that the combination of the signal from the pin 208 and the signal from the ring 60 may be used to compute the flow rate from the pump. If the set signal is a flow control signal then the combination of the speed and position are used to offset the set signal and return the valve 200 to a neutral position once the required flow is attained. Similarly, if the set signal indicates a pressure signal, then the pressure in the port 78 is monitored and the valve returned to neutral upon the set pressure being obtained.

As the swashplate 142 is adjusted, the flow of fluid into the grooves 160, 162 on the rear face 146 of the swashplate is controlled by the flow of the control valves 168 so that a constant support for the swashplate is maintained. Similarly, the port plate 64 is maintained against the end face by the action of the spring 68, 70 to maintain a fluid tight seal for the passage of fluid into and out of the barrel assembly 40.

Movement of the swashplate to a position in which pressurized fluid is delivered to the port 78 recharges the accumulator 220 as well as supplying flow to the actuators 170 and 172 and the grooves 160, 162. If the swashplate assembly 140 is returned to a neutral position, the pressurized fluid in the accumulator 220 is sufficient to provide the control function and maintain the balance of the swashplate 142.

During adjustment of the swashplate 142, the rolling action of the pins 190 across the end faces of the pistons 176 further minimizes the frictional forces applied to the swashplate 140 and thereby reduces the control forces that must be applied.

It will also be appreciated that by providing the ball joint 94 as part of the slipper, the forces imposed on the slipper are minimized and the angle of adjustment available increased to enhance the range of follow rates that are available.

All movement of the swashplate 140 is followed by the pin 208 and variations in the rotational speed are sensed by the pickup 216 to permit the control board 218 to provide adjustment of the control parameters. It will also be noted that the control function is located in the housing 18 separate from the rotating component so that the control board 218 and associated electric circuit is not subject to the hydraulic fluid that might adversely affect their operation.

The provision of the key 42 on the shaft 24 inhibits relative rotation between the shaft and barrel and thus reduces the oscillation and fretting that otherwise occurs with a typical splined connection. Any misalignment between the barrel and port plate 64 is accommodated by the spring biasing applied to the port plate 64 by the springs 68, 70 so that the keyed connection to the shaft is possible.

The accumulator provides a supply of pressure fluid to the control valve 200 to enhance the response to variations in the control signal when the pressure in the discharge system falls below the accumulator setting.

If the machine 10 is to be utilized as a motor, it will be appreciated that the pin 208 is operable to follow movement of the swashplate to either side of a neutral condition and therefore provide reversibility of the output shaft 24 that is used to drive a load. During such operation, the line 78 will be at a low pressure but the accumulator 220 supplies fluid to the control valve 200 to maintain control of the swashplate.

In the above embodiment, the port plate is biased against the end plate and floats relative to the barrel 40. An alternative embodiment is shown in FIGS. 21 to 26 in which like components are denoted with like reference numerals with a suffix 'a' added for clarity.

In the arrangement shown in FIGS. 21 to 26, the port plate 64a is arranged to float relative to the end plate 16a and for relative rotation to occur between the barrel 40a and the port plate 64a. The port plate 64a is biased into sealing engagement with the barrel 40a by springs 68a received in a counterbore 68a. In this way, minor misalignment between the barrel and end plate is accommodated. The counterbore 68a is sealed to the end plate 16a by sleeves 74a that accommodate axial movement and maintain a seal with O-rings 76a.

Figure 24:
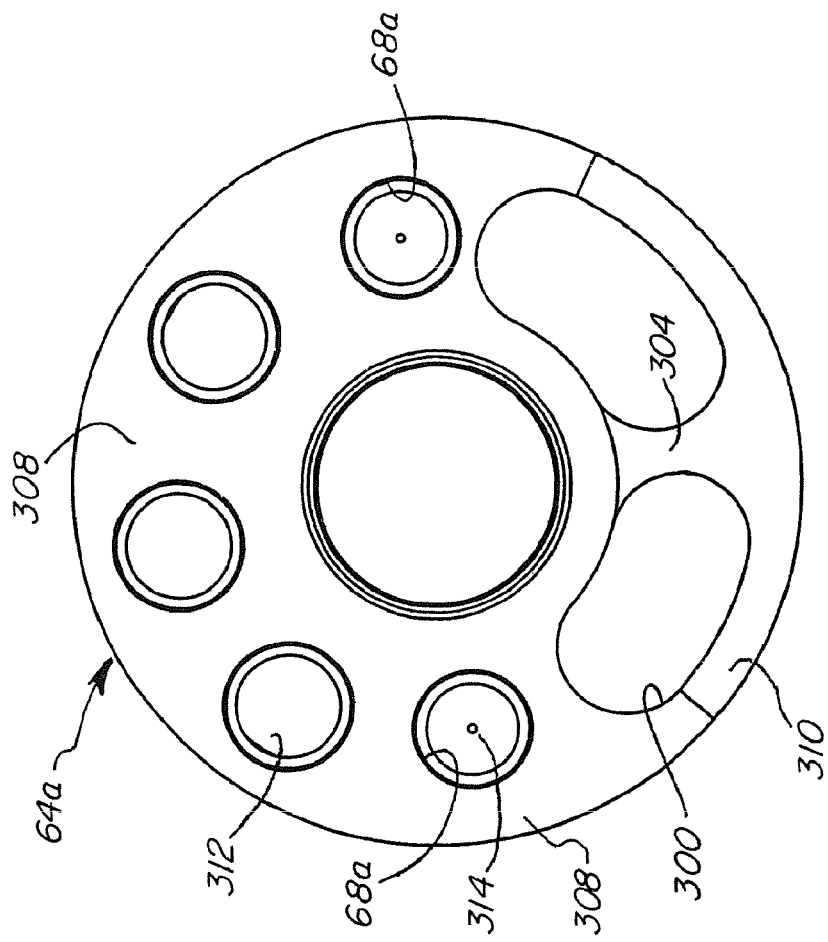
FIG. 24 is a rear view of the port plate of FIG. 23.
Figure 23:
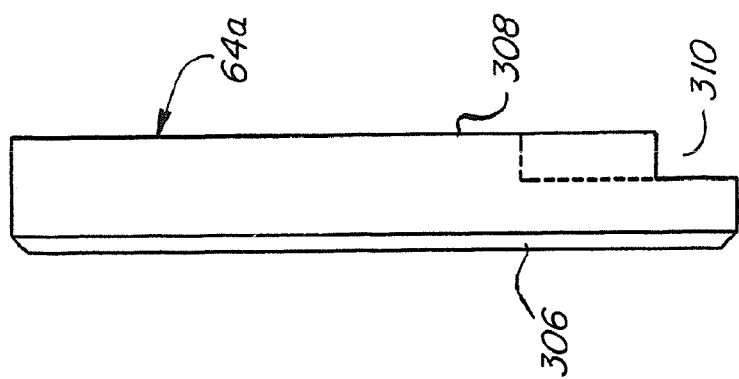
FIG. 23 is a side view of the port plate of FIG. 22.

As can be seen from FIG. 22, the port plate 64a has a pair of kidney shaped ports 300, 302. The port 300 extends through the plate 64a with a central web 304 recessed from the front face 306 of the plate 64a. The rear face 308 as shown in FIG. 24, is undercut as indicated at 310 to provide a clearance between the plate 64a and the end wall 16a.

The port 302 extends partially through the plate 64a and is intersected by three pressure ports 312 that extend from the rear face 308. Each of the ports 312 is configured to receive a sleeve 74a which engages in complimentary recesses in the end face 16a to provide a sealed communication between the plate 64a and the end face 16a.

A restricted orifice 314 is formed at the inner end of the counterbore 68a so as to extend through to the front face 306. The orifice provides a restricted access to the chamber formed by the sleeve 74a within the counterbore 68a and is positioned between the kidney ports 300, 302. A V-shaped notch 316 is formed in the front face 306 and progressively increases in breadth and depth toward the leading edge of the kidney port 302.

In operation, the front face 306 of plate 64a is forced against the end face of the barrel 40a. The bores 50a are located at the same radius as the kidney ports 300, 302 and therefore pass successively over the port plate as the barrel 40 rotates. As the bores 50a traverse the port 300 fluid is induced into the cylinders. Similarly, as the bores 50a traverse the port 302, fluid is expelled from the cylinders and directed through the sleeves 74a to the pressure conduit 78a. During this rotation, the face 306 is maintained by the springs 68a against the barrel 40a to maintain an effective seal.

It will be noted that the adjacent ends of the ports 300, 302 are spaced apart by a distance greater than the diameter of the bores 50a. This is shown is FIG. 26A where the disposition of the bores at a particular position of the barrel 40a is shown. The bore 50a shown in chain dot line is associated with a piston that has just passed bottom-dead center, i.e. the maximum volume of the cylinder and is starting to move axially to expel fluid. However, the rate of movement of the piston is relatively small by virtue of the sinusoidal nature of the induced movement. In the position shown in FIG. 26A, the cylinder has just passed the terminal portion of the inlet port 300 but the small land created between the end of the bore and the terminal edge of the port 302 is such that there is a small leakage from the piston into the low pressure port 300. It will also be observed from FIG. 26A that the orifice 314 is positioned within the cylinder.

Figure 26A:
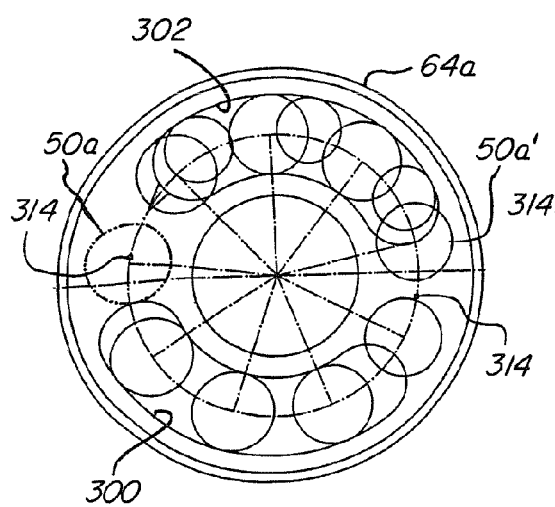
FIG. 26 illustrates the sequential movement of a cylinder across a port plate of FIG. 22.
Figure 26B:
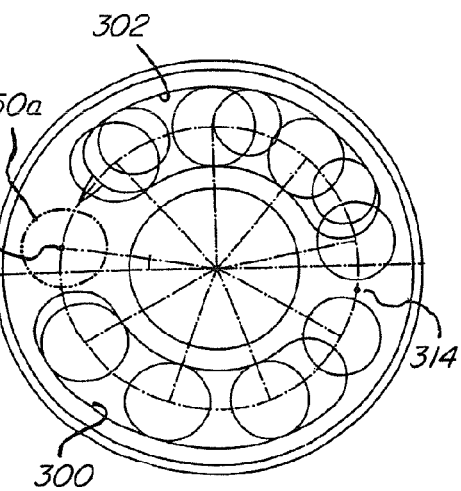
Figure 26C:
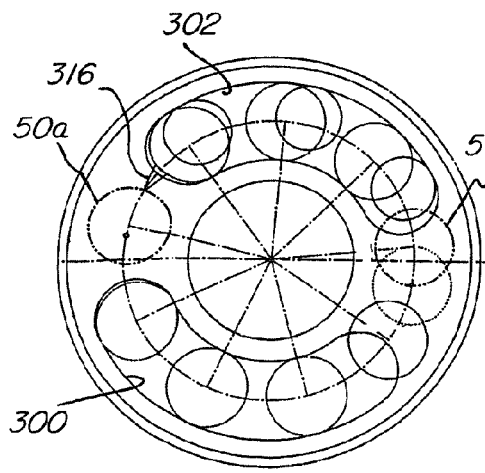

As the barrel continues to rotate as shown in FIG. 26B, the bore is centered over the orifice 314 and the limited movement of the piston is accommodated by compression of the fluid and components within the chamber 68a. Again, because of the sinusoidal nature of the motion, the axial displacement is minimized during this portion of the rotation. Further rotation of the barrel 40a brings the bore 50a to a position shown in FIG. 26C in which it overlaps the notch 316 and therefore fluid in the cylinder may be expelled into the high pressure kidney port 302. The tapered dimensions of the notch 316 allows the oil to progressively enter the port 302 to avoid an abrupt transition and thereby reduce potential noise. At this time the cylinder is still in communication with the bore 68a and high pressure fluid within that bore can be expelled through the orifice 314 and into the pressure port 302.

Figure 26D:
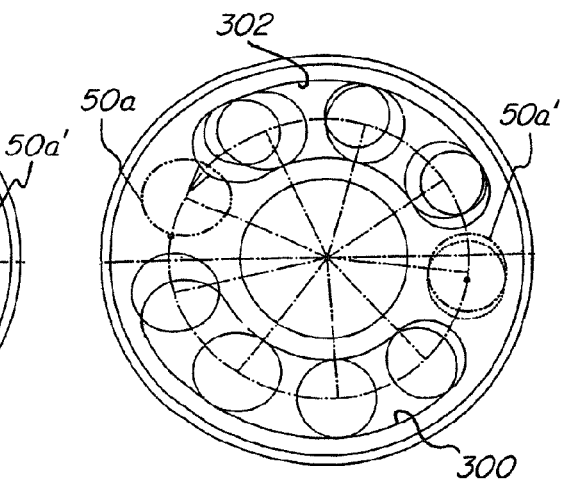
Figure 27:
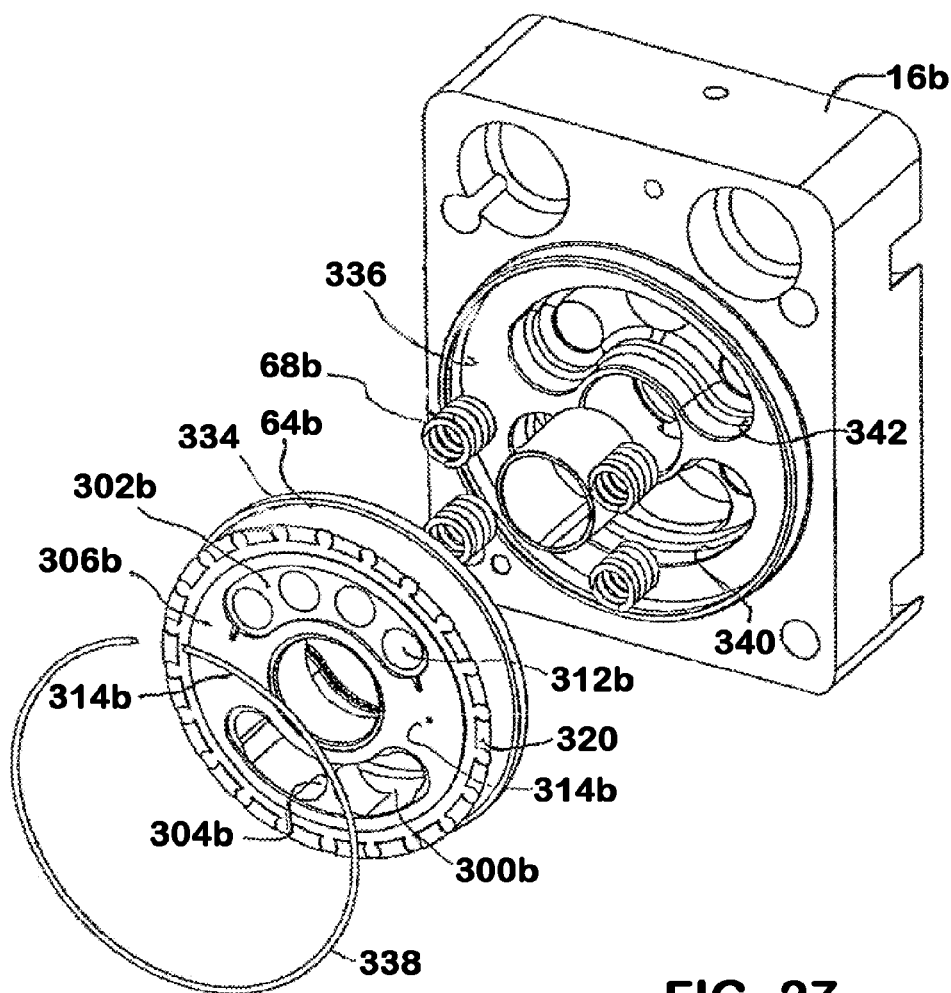
FIG. 27 is an exploded perspective view of a further embodiment of port plate.
Figure 28:
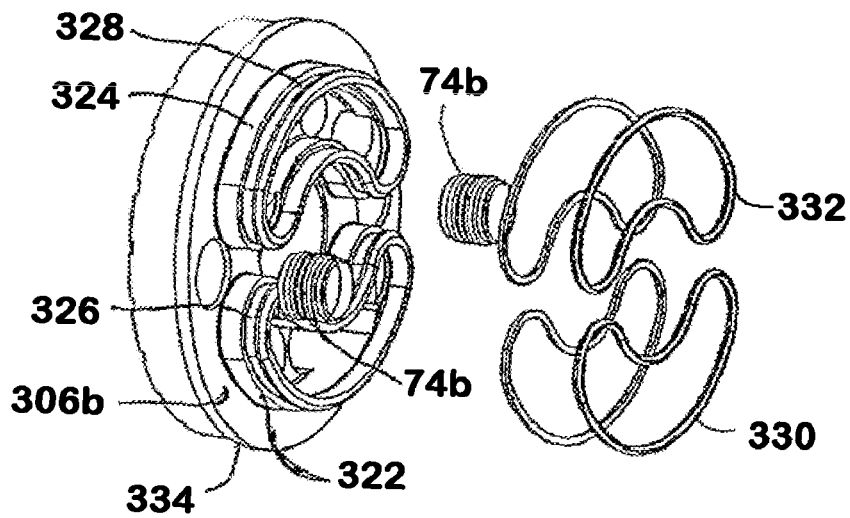
FIG. 28 is a rear perspective view of the port plate of FIG. 27.
Figure 29:
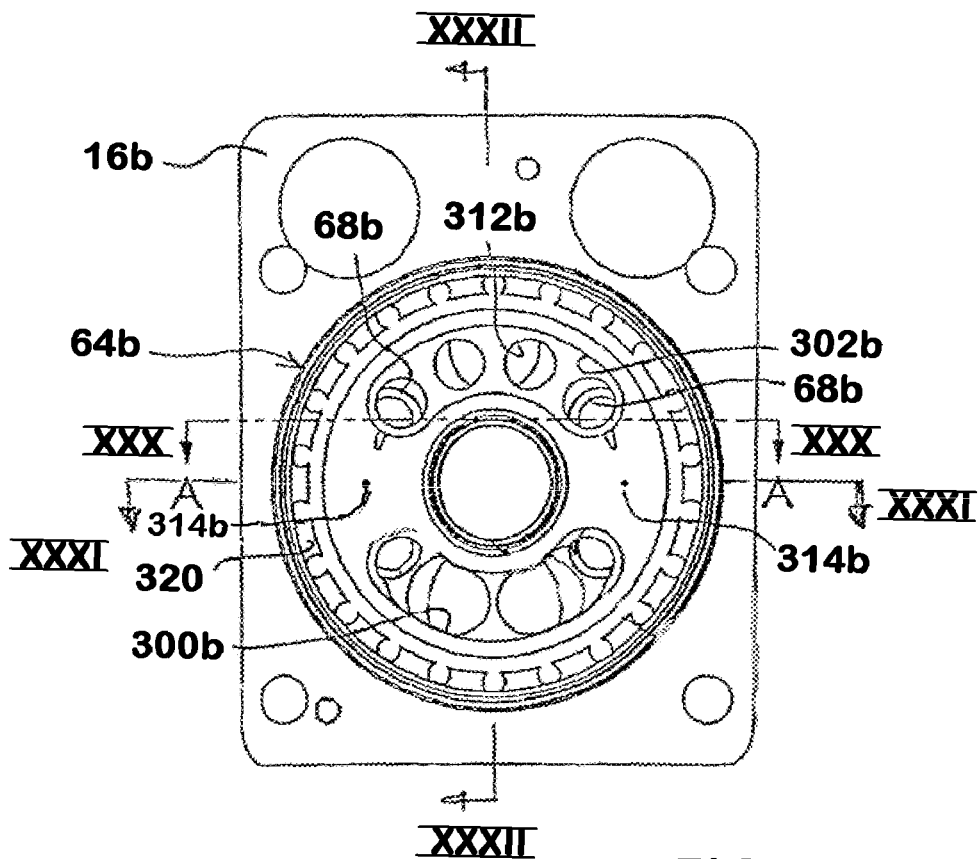
FIG. 29 is a front view of the port plate of FIG. 27.
Figure 30:
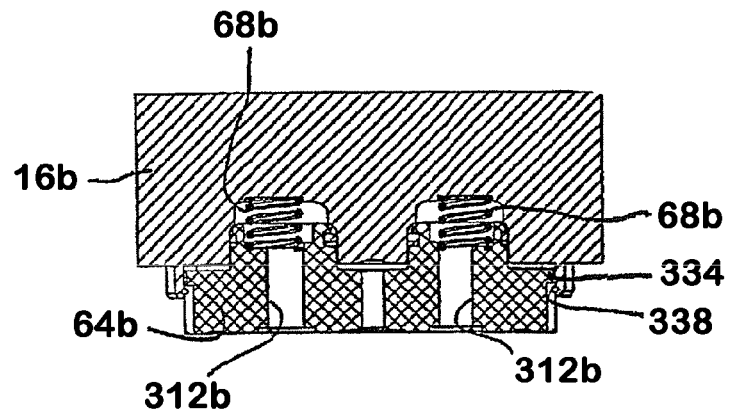
FIG. 30 is a section on the line XXX-XXX of FIG. 29.

Continued rotation, as shown in FIG. 26D moves the bore 50a so it begins to overlap the kidney part 302 and has unrestricted access to the pressure conduit 78a.

Similarly, as the bore 50a moves from the inlet port 300 to the pressure port 302, a circumferentially spaced bore indicated at 50*a*' on FIG. 26A moves from the high pressure kidney port 302 to the suction port. As can be seen from FIG. 26A, as the piston approaches top-dead center, the communication with the high pressure port is progressively reduced until, as it moves to the position shown in FIG. 26C, it is in communication with the orifice 314. Again, the piston is at its minimum rate of axial movement as it passes the top-dead center and the continued displacement of fluid can be accommodated within the chamber 68*a*. At the position shown in FIG. 26D, the piston has gone past top-dead center and is being moved towards bottom-dead center. In this position however, it is not in communication with the low pressure kidney port 300 and the residual pressure within the chamber 68*a* replenishes the fluid within the cylinder to avoid cavitation. As the barrel continues to rotate, the cylinder is put into communication with the low pressure port and the fluid is drawn into the cylinder.

It will be seen therefore that as the barrel 40*a* rotates, the pistons are alternatively connected to pressure and section ports 302, 300 and that the spacing of the ports is such as to inhibit leakage between the high pressure and low pressure chambers. The provision of the restricted orifice 314 together with the balancing chamber 68*a* accommodates the small change in volume as the pistons go over bottom-dead center or top-dead center as well as providing a balancing force to maintain the port plate against the end of the barrel 40*a*. The undercut 310 provides a relatively unrestricted ingress of fluid into the cylinders to enhance the efficiency of the machine and inhibit cavitation.

A further embodiment of port plate similar to that shown in FIGS. 21 to 26 is illustrated in FIGS. 27 through 32 in which like reference numerals will be utilised to identify like components with a suffix b added for clarity.

In the arrangement of FIGS. 27 through 32, the port plate 64*b* is arranged to float relative to the end plate 16*b* and for relative rotation to occur between the barrel 40*b* and the port plate 64*b* as described above with respect to FIGS. 21 to 26. The port plate 64*b* has a pair of kidney shaped ports 300*b*, 302*b*. The port 300*b* extends through the plate 64*b* with a central web 304*b* recessed from the front face 306*b* of the plate 64*b*. A hydro dynamic bearing 320 is formed on the periphery of the front face 306*b* to mate with the end face of the barrel 40*b*. The port 302*b* extends partially through the plate 64*b* from the front face 306*b* and is intersected by pressure ports 312*b* that extend from a rear face 308*b* best seen in FIG. 28.

The rear face 308*b* has a pair of upstanding walls 322, 324 that extend around the periphery of the ports 300*b*, 302*b* respectively. A groove 326, 328 is provided in each of the walls 322, 324 to receive respective sealing rings 330, 332. A radial shoulder 334 is formed at the rear face 308*b* and is a snug fit within a bore 336 provided in the front face of the end plate 16*b*. A circlip 338 co-operates with a grove formed in the bore 336 to retain the port plate 64*a* within the bore 336.

Kidney shape inlet and outlet ducts 340, 342 respectively are provided at the base of the bore 336 and are of complimentary shape to the walls 322, 324 respectively to permit the walls 340, 342 to rest within the ducts. The ducts 340, 342 communicate with the inlet conduit and outlet conduit (not shown) to supply fluid to the rotating group and convey fluid away from the rotating group as is conventional. The sealing rings 330, 332 ensure a fluid tight fit between the walls 322, 324 and their respective ducts 340, 342 whilst accommodating limited axial movement.

Figure 31:
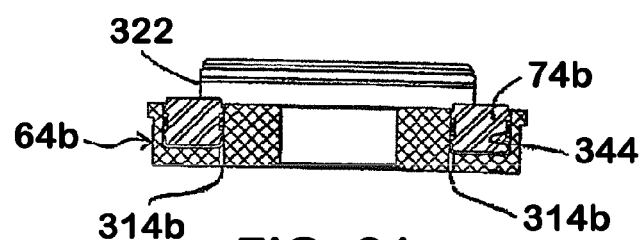
FIG. 31 is a section on the line XXXI-XXXI of FIG. 29.
Figure 32:
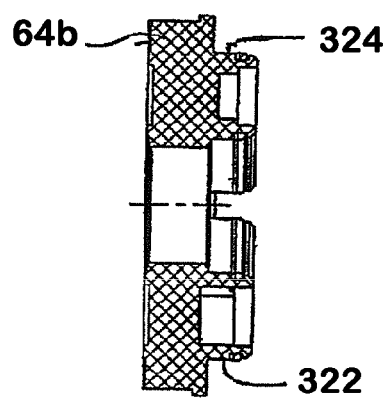
FIG. 32 is a section on the line XXXII-XXXII of FIG. 29.

The port plate 64*b* is biased away from the end plate 16*b* by springs 68*b*. The springs 68*b* are accommodated within the ducts 340, 342 and act against the end face 308 to provide the necessary bias against the force generated by the pressure of fluid in the barrel. A balancing chamber is formed at diametrically opposed locations on the plate 64*b* by sleeve 74*b*. As best seen in FIG. 31, the sleeves 74*b* are accommodated within counter bores 344 in the plate 64*b*. A restricted orifice 314*b* connects the counter bore 344 with the front face 306*b*. The sleeve 74*b* are axially movable within the counter bores 344 and are sealed by o-rings on the periphery of the sleeve 74*b*. The balancing chamber are located at the cross over between the pressure and suction ports to accommodate the transition.

The operation is similar to that described above with respect to FIGS. 21 through 26. To maintain an effective seal between the port plate 64*b* and barrel, the area of the recesses 342 is selected to have a slightly greater effective area than the port 302*b*, typically in the range of 2 to 5% greater, with 3% preferred. A positive bias from the pressurized fluid is thus provided to supplement the action of the spring 68*b* and maintain a seal between the port plate and the barrel. It is found that if the machine is maintained under pressure but with no rotation, there is a tendency for the pressure fluid to creep between the port plate and barrel and separate the sealing surfaces. The provision of the enlarged area for the port provides a positive bias even without rotation of the barrel relative to the port plate to maintain the ceiling effect. If a perfect seal in assumed between the face of the barrel and the port plate, a differential in area of 25% is found to be suitable. In practice, such an area differential when combined with the inevitable pressure gradient at the edge of the port produces an effective differential in the order of 3% to maintain effective sealing.

Figure 33:
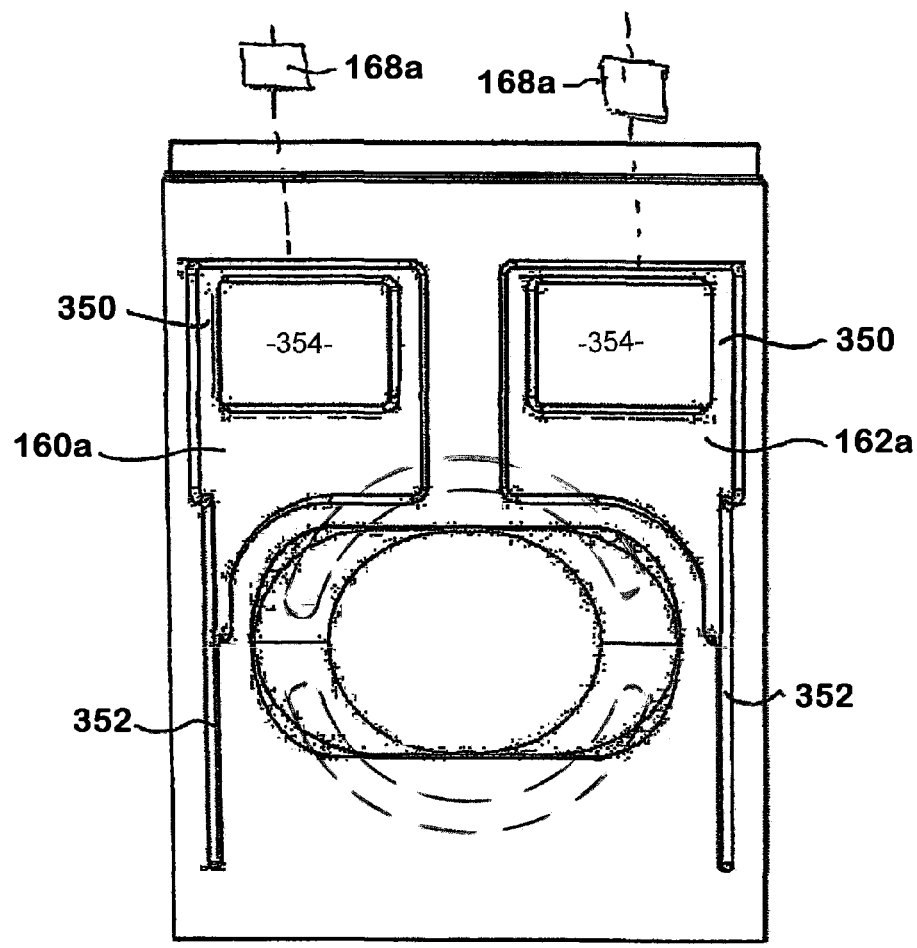
FIG. 33 is an end view of an alternative embodiment of swashplate.

An alternative embodiment of swashplate is shown in FIG. 33 in which like components will be denoted with like reference numerals and a suffix 'a' added for clarity. In the embodiment described in FIG. 7 above, the grooves 160, 162 are aligned with the kidney ports 80, 82 so as to provide increased load carrying capacity for the high pressure loading of the pistons.

In the embodiment of FIG. 33, the grooves 160*a*, 162*a* extend in a direction to bridge the kidney ports 80, 82, that is in a direction parallel to the axis of rotation of the swashplate, and have a varying area to accommodate the loads imposed. As can be seen in FIG. 33, each of the grooves 160*a*, 162*a* is generally an inverted L-shape with an enlarged head 350 and an elongate tail 352. Flow to the grooves 160*a*, 162*a* is controlled by respective flow control valves 168*a*. A land 354 is provided in the head 350 to adjust the bearing area. The major dimension, which is the longest dimension, of the recess is from one end of the elongated tail to the opposite end of the enlarged head; and so is parallel to an adjustment axis, around which the swashplate rotates.

The head 350 is generally aligned with the line of action of the actuators 170, 172 to provide an enlarged bearing area whilst the tails 352 provide a bearing area for balance of the forces. In this manner, the grooves 160*a*, 162*a* are located to provide a fluid bearing in which the higher forces are distributed between the two grooves and the shape of the groove used to compensate for difference loading. It will be noted that the tail 352 is of varying width to provide an increased area in opposition to the high pressure loads with a reduced area to oppose the low pressure loads. It will be appreciated that the grooves 160*a*, 162*a* may be contoured to suit the loading characteristics of the particular machine and provide uniform support for the swashplate.

What is claimed is:

1. A rotary hydraulic machine comprising a housing, a rotating group within said housing including a barrel and a plurality of pistons slideable within cylinders formed in said barrel, a swashplate operable upon said pistons to induce reciprocation thereof in respective ones of said cylinders to transfer fluid between an inlet port and an outlet port as said barrel rotates about its axis of rotation, and an actuator operable upon said swashplate to adjust the disposition thereof relative to said housing about an adjustment axis orthogonal to said axis of rotation of said barrel and thereby vary the stroke of said pistons in said cylinders, said swashplate having a bearing surface engagable with a complementary surface on said housing and a fluid bearing interposed between said surfaces, said fluid bearing including a pair of recesses formed between said surfaces, each of said recesses having a major dimension along a longitudinal axis, said longitudinal axis extending parallel to said adjustment axis of said swashplate, and a fluid supply to provide fluid to said recesses.

2. A rotary hydraulic machine according to claim 1 wherein said fluid bearing is supplied with fluid from one of said ports.

3. A rotary hydraulic machine according to claim 2 wherein said fluid is supplied through a pressure compensating flow control valve to maintain a predetermined flow of fluid as pressure at said port varies.

4. A rotary hydraulic machine according to claim 3 wherein said recesses are configured to provide a bearing area to balance forces imposed on said swashplate by connection of said pistons to respective ones of said ports.

5. A rotary hydraulic machine according to claim 1 wherein said recesses vary in width along said longitudinal axis.

6. A rotary hydraulic machine according to claim 5 wherein each recess has an enlarged head and an elongated tail.

7. A rotary hydraulic machine according to claim 6 wherein said enlarged head is aligned with said actuator to oppose forces imposed thereby.

8. A rotary hydraulic machine according to claim 7 wherein said elongate tail has a varying width with a greater width aligned with said outlet ports.

9. A rotary hydraulic machine according to claim 7 wherein a land is provided in said enlarged head.

10. A rotary hydraulic machine according to claim 6 wherein said recesses are spaced apart on opposite sides of said axis of rotation with said elongate tails extending parallel to one another.

11. A rotary hydraulic machine comprising a housing, a rotating group within said housing including a barrel and a plurality of pistons slidable within cylinders formed in said barrel, a swashplate operable upon said pistons to induce reciprocation thereof in respective ones of said cylinders to transfer fluid between an inlet port and an outlet port as said barrel rotates, and an actuator operable upon said swashplate to adjust the disposition thereof relative to said housing and thereby vary the stroke of said pistons in said cylinders, said swashplate including a body having a part cylindrical bearing face and an oppositely directed planar face engaged by said pistons with said part cylindrical bearing face engaging a complementary surface of said housing and defining an adjustment axis of said swashplate, a fluid bearing between said bearing face and said complementary surface and including a pair of recesses having a major dimension along a longitudinal axis, said longitudinal axis extending in a direction parallel to said adjustment axis of said swashplate, said body extending along said axis of rotation beyond said barrel to provide an extension of said body to one side of said barrel, said actuator including a pair of motors each engaging said extension on opposite sides of said adjustment axis to impart rotation in opposite directions to said swashplate, said actuators thereby being offset to one side of said barrel.

12. A hydraulic machine according to claim 11 wherein said motors are disposed parallel to and spaced from the axis of rotation of said barrel in said housing.

13. A hydraulic machine according to claim 12 wherein each of said motors comprises a linear motor having a working piston extendible from an actuator cylinder upon application of fluid pressure to said motor.

14. A hydraulic machine according to claim 13 wherein each of said working pistons engages a convex abutment protruding from said planar face to provide a rolling engagement of said working piston over said abutment as said swashplate rotates.

15. A hydraulic machine according to claim 14 wherein said abutments are provided by cylindrical pins inserted in to part cylindrical recesses in said body.

16. A hydraulic machine according to claim 15 wherein said housing includes a casing having a complementary bearing surface to receive said part cylindrical bearing face of said body of said swashplate and said motors are secured to said casing to act between said casing and said swashplate.

17. A hydraulic machine according to claim 16 wherein said motors are each secured in bores in said casing.

18. A hydraulic machine according to claim 17 wherein said actuator cylinder of said motors is secured to a respective one of said bores.

19. A hydraulic machine according to claim 16 wherein a fluid bearing acts between said bearing surface and said bearing face.

20. A hydraulic machine according to claim 19 wherein fluid is supplied to said fluid bearing by a flow control valve to maintain a predetermined flow rate to said bearing.

21. A hydraulic machine according to claim 20 wherein fluid is supplied from one of said ports to said fluid bearing and said flow control valve is pressure compensated to maintain said predetermined flow rate as said pressure at said port fluctuates.

22. A hydraulic machine according to claim 21 wherein said fluid bearing includes a pair of recesses in at least one of said surfaces to receive pressurised fluid.

23. A hydraulic machine according to claim 22 wherein said recesses are aligned with respective ones of said ports.

24. A rotary hydraulic machine according to claim 23 wherein at least one of said surfaces has a coating applied thereto to reduce friction between said surfaces.

25. A rotary hydraulic machine according to claim 24 wherein said coating is applied to said bearing surface.

26. A rotary hydraulic machine according to claim 25 wherein said coating is a polymer.

27. A rotary hydraulic machine according to claim 26 wherein said polymer is a nylon.

28. A rotary hydraulic machine according to claim 27 wherein said nylon is formulated from a type II polyamide resin.

29. A rotary hydraulic machine comprising a housing, a rotating group within said housing including a barrel and a plurality of pistons slidable within cylinders formed in said barrel, a swashplate operable upon said pistons to induce reciprocation thereof in respective ones of said cylinders to transfer fluid between an inlet port and an outlet port as said barrel rotates about a longitudinal axis, a bearing assembly to support said swashplate in said housing for rotation relative to said housing about an adjustment axis and an actuator operable upon said swashplate to adjust the disposition thereof relative to said housing and thereby vary the stroke of said pistons in said cylinders, said swashplate including a body having a planar face engaged by said pistons and an extension to one side of said barrel having a pair of convex abutments protruding from said extension on opposite sides of said axis of rotation and said longitudinal axis, and said actuator including a pair of motors each having an end face and engaging a respective one of said convex abutments on said extension on opposite sides of said axis of rotation to impart rotation in opposite directions to said swashplate, said convex abutments being positioned on said extension relative to said axis of rotation such that the points of contact of said convex abutments with said end faces of said motors lie on a common diameter passing through said adjustment axis of said swashplate, when said common diameter is perpendicular to an axis of each of said motors, said convex abutments thereby rolling across said end face of said motors as said swashplate is adjusted and thereby avoiding relative sliding therebetween.

30. A hydraulic machine according to claim 29 wherein said motors each include a working piston and said end face is formed on said working piston to be engagable with a respective one of said abutments.

31. A hydraulic machine according to claim 30 wherein said abutments are provided by cylindrical pins received in part cylindrical bores in said swashplate.

32. A hydraulic machine according to claim 31 wherein said bearing assembly includes a part cylindrical convex bearing surface on said swashplate oppositely directed to said planar surface and a complementary surface in said housing to define said axis of rotation.

33. A hydraulic machine according to claim 32 wherein a fluid bearing is interposed between said surfaces.

34. A rotary hydraulic machine according to claim 32 wherein at least one of said surfaces has a coating applied thereto to reduce friction between said surfaces.

35. A rotary hydraulic machine according to claim 34 wherein said coating is applied to said bearing surface.

36. A rotary hydraulic machine according to claim 35 wherein said coating is a polymer.

37. A rotary hydraulic machine according to claim 36 wherein said polymer is a nylon.

38. A rotary hydraulic machine according to claim 37 wherein said nylon is formulated from a type II polyamide resin.

39. A hydraulic machine according to claim 30 wherein said working pistons are slidably received in an actuator cylinder secured to said housing.

40. A hydraulic machine according to claim 39 wherein said actuator cylinder is located in a bore in said housing.

* * * * *